United States Patent [19]
Futsuhara

[11] Patent Number: 5,703,452
[45] Date of Patent: Dec. 30, 1997

[54] SAFETY ENSURING APPARATUS

[75] Inventor: Koichi Futsuhara, Urawa, Japan

[73] Assignee: The Nippon Signal Co., Ltd., Tokyo, Japan

[21] Appl. No.: 718,476

[22] PCT Filed: Apr. 6, 1995

[86] PCT No.: PCT/JP95/00675

§ 371 Date: Oct. 7, 1996

§ 102(e) Date: Oct. 7, 1996

[87] PCT Pub. No.: WO96/24798

PCT Pub. Date: Aug. 15, 1996

[30] Foreign Application Priority Data

Feb. 7, 1995 [WO] WIPO .............. PCT/JP95/00165
Mar. 6, 1995 [WO] WIPO .............. PCT/JP95/00243

[51] Int. Cl.$^6$ ................ F16P 3/08; F16P 3/10
[52] U.S. Cl. .............. 318/558; 256/1; 49/31; 361/1; 192/129 R
[58] Field of Search ............. 318/563, 565, 318/264, 265, 266, 286, 466, 467, 468, 558; 256/1; 49/31, 50, 507; 361/1; 192/129 R

[56] References Cited

U.S. PATENT DOCUMENTS

| | | | |
|---|---|---|---|
| 4,386,341 | 5/1983 | Yamamoto | 340/384 E |
| 4,870,592 | 9/1989 | Lampi et al. | 364/468 |

Primary Examiner—Bentsu Ro
Attorney, Agent, or Firm—Oblon, Spivak, McClelland, Maier & Neustadt, P.C.

[57] ABSTRACT

A movable section of a machine is enclosed by a fence and a door. A locking device provided on the door is controlled by a movable section control circuit. In the movable section control circuit, an operating switch outputs either a movable section ON signal or a movable section OFF signal. A door switch outputs an ON signal representing that the door is open. A switch means constitutes a self-holding circuit which uses an AND signal constituted of the movable section OFF signal from the operating switch and a rotation stop signal as a reset input signal and an OR signal constituted of an ON signal from the door switch and a rotation-presence signal as trigger signal to provide the locking device with a control signal. When a sensor fails, the locking devive is not unlocked even if the operating switch for driving the movable section is closed.

2 Claims, 17 Drawing Sheets operation stop immediately after operation start shifting toward operation stop in FIG. 9 operation stop

SAFETY ENSURING APPARATUS

TECHNICAL FIELD

The present invention relates to a safety ensuring apparatus that allows an operator to approach a movable section of a machine after the movable section, which is driven by a motor or the like, has stopped rotating or moving. The safety ensuring apparatus according to the present invention is particularly suited for constituting a guard system in which the movable section of a machine is surrounded by a fence with a door having a locking device provided at a portion of the fence so that, when the locking device of the door is released, the movable section within the fence can be approached.

BACKGROUND ART

A safety ensuring apparatus of this type is disclosed in PCT/JP93/00758. Also, a sensor for verifying that the rotation or movement of a movable portion has stopped is disclosed in International Publication WO94/23303. In addition, a device for detecting that rotation is at a specific rate or lower is also required in an apparatus that includes a movable portion driven by a motor or the like, i.e., a robot or the like, as a safety device that allows the operator to approach the apparatus only after the movable portion has completely stopped its operation, in order to assure the safety of the operator who must approach the apparatus. Such safety devices include the motor rotation stop detecting device disclosed in International Publication WO94/23303, which is capable of reliably detecting that the rotation of a motor has stopped, including rotation under inertia, and operates toward safety when the apparatus has had a failure, thereby providing a high degree of safety. However, the device disclosed in this prior art publication has problems yet to be solved, i.e., a delay in issuing notification of the stop that occurs because the device is not provided with a function for detecting the rotation rate and, since a bridge circuit is employed in a rotation sensor, adjustment of the bridge circuit is required.

These problems are eliminated in PCT/JP95/00165, for which an application was submitted by the applicant. However, PCT/JP95/00165 only discloses the technology for issuing notification of movable portion stop, and the disclosure does not encompass the use of the movable portion stop signal as a signal for assuring safety of the operator against the movable portion.

In addition, PCT/JP95/00243 discloses a safety securing device which uses a movable portion stop signal for a signal for assuring the safety of the operator against the mechanical movable portion. To be more specific, the publication discloses a device that assures safety by using a movable portion stop signal and a movable portion rotation signal as signals for assuring safety of the operator against the mechanical movable portion when constituting a guard system in which the mechanical movable portion is enclosed by a fence, with a door having a locking device provided at a portion of the fence and the operator is allowed to approach the mechanical movable portion within the fence when the locking device at the door is released. However, PCT/JP95/00243 carries the danger of the locking device being released if the operating switch is turned on in order to drive the mechanical movable portion when the operator does not realize that the sensor has gone down.

DISCLOSURE OF THE INVENTION

Accordingly, it is an object of the present invention to provide an apparatus that assures the safety of the operator by using a movable section stop signal and a movable section rotation signal as signals for assuring the safety of the operator against the movable section of a machine when constituting a guard system in which the movable section of a machine is enclosed by a fence provided with a door having a locking device at a portion of the fence and the movable section of a machine within the fence can be approached when the locking device of the door is released.

It is a further object of the present invention to provide a safety ensuring apparatus in which the locking device does not become released even if the operating switch is turned on in order to drive the movable section of a machine when the sensor has gone down.

In order to achieve the objects described above, the safety ensuring apparatus according to the present invention includes a rotation detecting means, a rotation monitoring circuit, a rotation stop monitoring circuit and a movable section control circuit.

The rotation detecting means detects rotation of the movable section and outputs a detection signal that corresponds to the rotation rate. The rotation monitoring circuit, to which the detection signal from the rotation detecting means is provided, outputs a rotation-presence signal when the detection signal indicates that the movable section is rotating. The rotation stop monitoring circuit, to which the detection signal from the rotation detecting means is provided, outputs a rotation stop signal when the detection signal indicates a rotation rate that is lower than a predetermined rotation rate. The movable section control circuit, which uses at least either the rotation-presence signal or the rotation stop signal and an external command signal as its input signals, controls the movable section with its logic. The movable section is enclosed by a fence and a door provided at a portion of the fence.

The door includes a locking device which is controlled by the movable section control circuit.

As a feature of the present invention, the movable section control circuit includes an operating switch, a door switch and a means for switching. The operating switch outputs either a movable section ON signal or a movable section OFF signal. The door switch outputs an ON signal indicating that the door is open. The means for switching constitutes a self-holding circuit which uses an AND signal constituted of the movable section OFF signal from the operating switch and the rotation stop signal as a reset input signal and uses an OR signal constituted of the ON signal from the door switch and the rotation-presence signal as a trigger signal, and provides the locking device with a control signal.

The operation of the movable section may include two modes, i.e., rotatory and linear movement. In this specification, in order to simplify the explanation, it is assumed that the operation is rotatory, and that the explanation includes linear movement.

BRIEF DESCRIPTION OF THE DRAWINGS

Other advantages, features and objects of the present invention are explained in further detail in reference to the attached drawings.

BEST MODE FOR CARRYING OUT THE INVENTION

Figure 1:
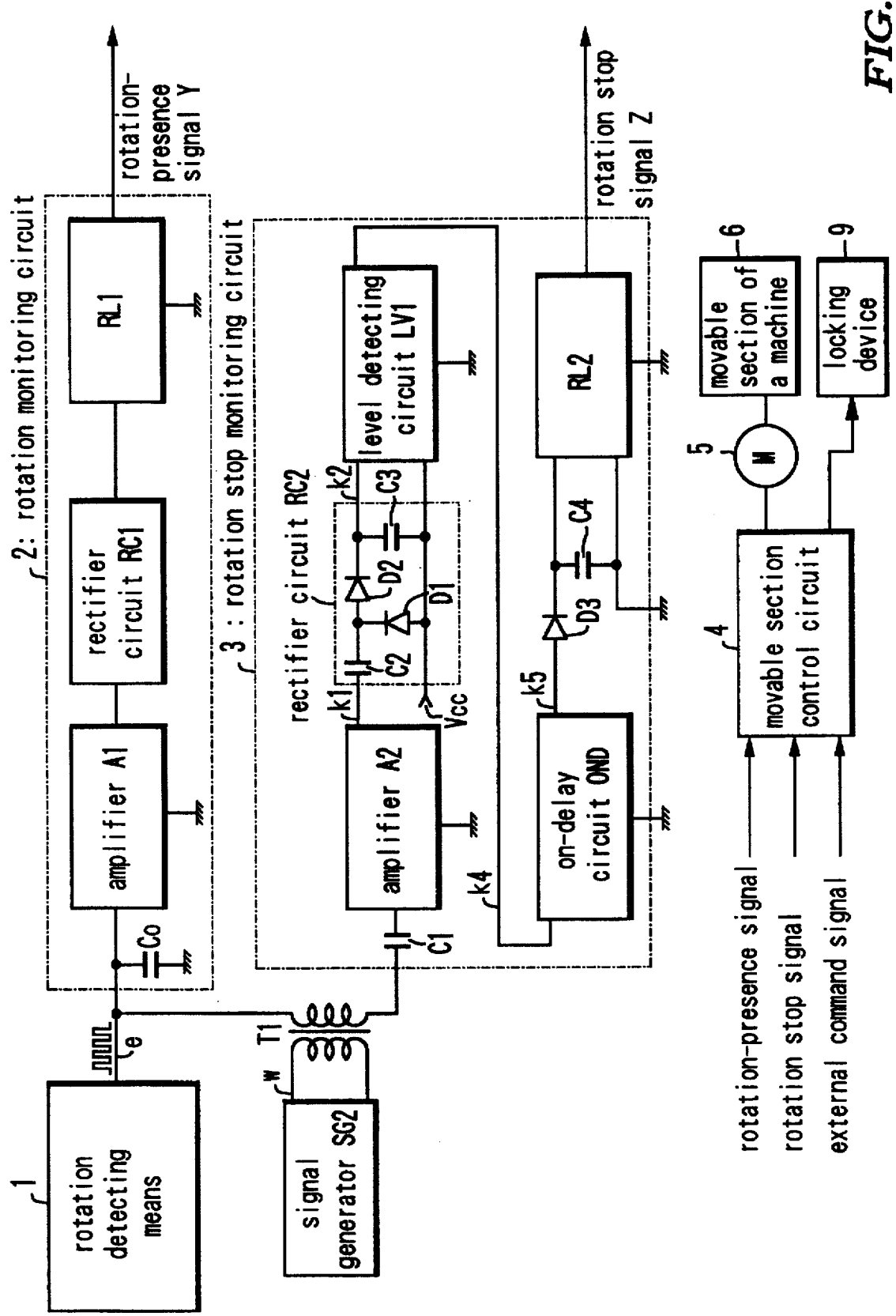
FIG. 1 is a block diagram of the safety ensuring apparatus according to the present invention.

In FIG. 1, which shows a specific circuit structure of the safety ensuring apparatus according to the present invention, the safety ensuring apparatus according to the present invention is provided with a rotation detecting means 1, a rotation monitoring circuit 2, a rotation stop monitoring circuit 3, a movable section control circuit 4 and a locking device 9.

Reference number 5 indicates a power source that includes, for instance, a motor M and the like, and reference number 6 indicates a mechanical movable section.

Figure 2:
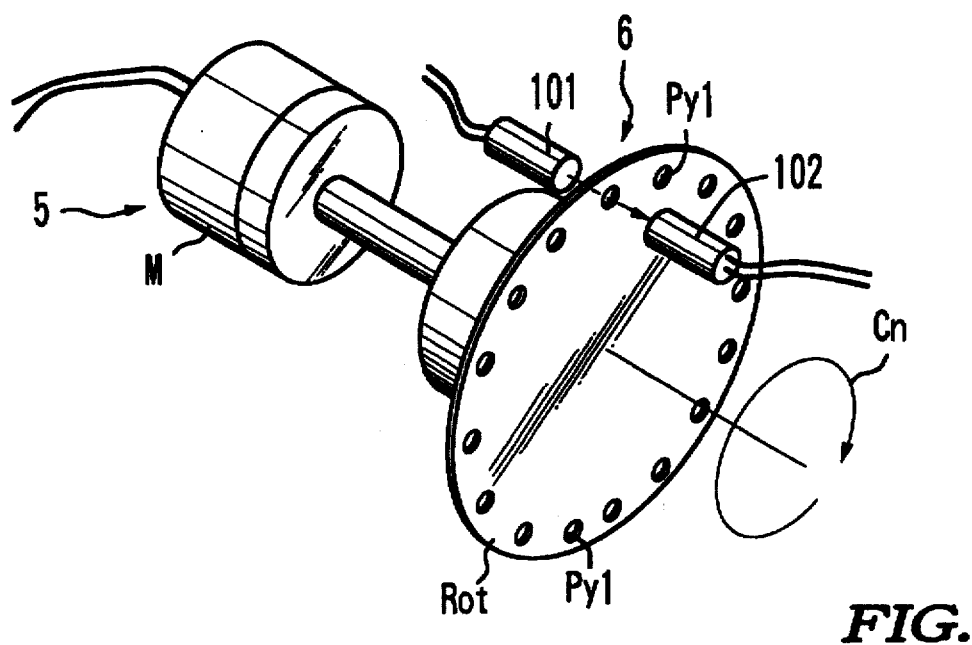
FIG. 2 is a perspective of a rotation sensor employed in the rotation detecting means.

The rotation detecting means 1 detects rotation of the movable section and outputs a detection signal constituted of an AC signal. Under normal circumstances the rotation detecting means 1 will include a sensor for detecting rotation of the movable section and a circuit that processes sensor output signals. Such a rotation detecting means 1 is disclosed in International Publication WO94/23303 mentioned earlier. FIG. 2 is a perspective of the sensor which is employed in the rotation detecting means disclosed in the publication mentioned above and FIG. 3 is a partial cross section of the same sensor. A movable section Rot is included in the movable section of a machine 6 and is rotated in the direction indicated with the arrow Cn by the power source 5 constituted of the motor M and the like. The movable section Rot is provided with through holes Py provided on the same circumference with an appropriate pitch. On opposite sides of the movable section Rot, a transmitting element 101 and a receiving element 102 are provided facing each other. The transmitting element 101 may be, for instance, a light emitting element and the receiving element 102 may be a light receiving element. When the movable section Rot is rotating, every time a through hole Py of the movable section Rot is located between the transmitting element 101 and the receiving element 102, a signal transmitted from the transmitting element 101 is received by the receiving element 102. When a portion of the movable section Rot where no through hole Py is provided is located between the transmitting element 101 and the receiving element 102, a signal transmitted from the transmitting element 101 is blocked by the movable section Rot and, as a result, the signal transmitted by the transmitting element 101 is not received by the receiving element 102. Consequently, when the movable section Rot is rotating, an AC signal is output from the receiving element 102. A sensor circuit included in the rotation detecting means 1 amplifies the AC signal sent from the receiving element 102 to output an amplified AC signal e.

Figure 3:
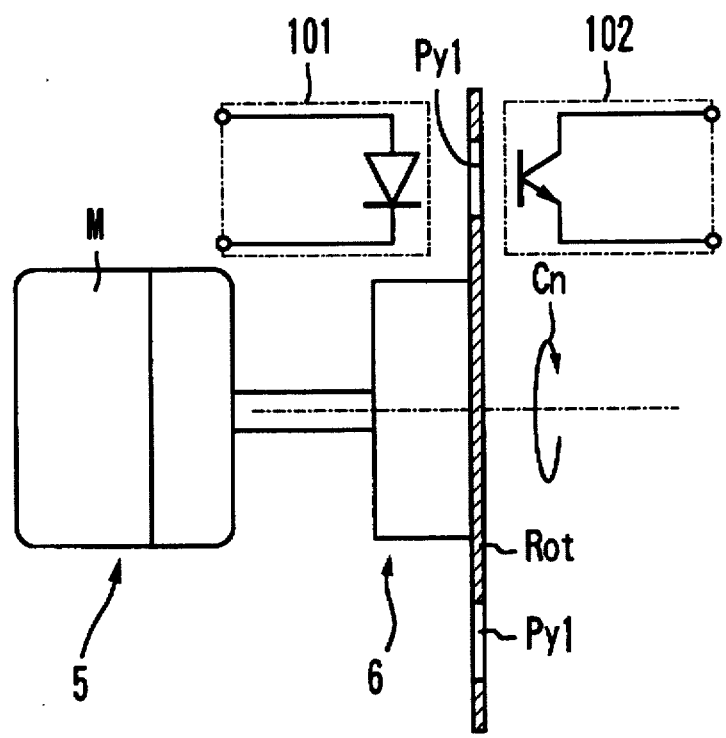
FIG. 3 is a partial cross section of the rotation sensor shown in FIG. 2.
Figure 4:
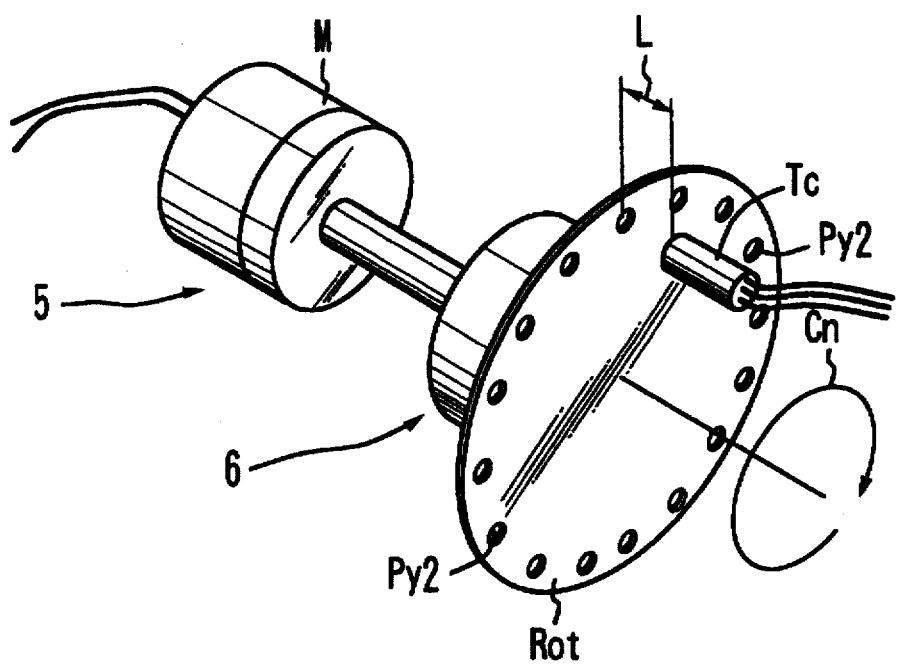
FIG. 4 is a perspective of another rotation sensor employed in the rotation detecting means.
Figure 5:
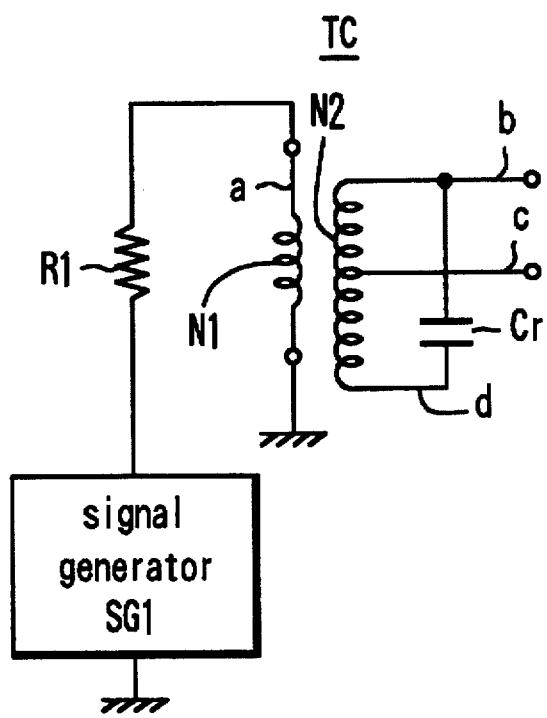
FIG. 5 is a circuit diagram of the rotation sensor shown in FIG. 4.

The sensor that is included in the rotation detecting means 1 is not limited to that shown in FIGS. 2 and 3. Basically, the only requirement imposed on the sensor is that it be capable of outputting an AC signal in response to the rotation of the movable section Rot. Such an example is shown in FIGS. 4 and 5. The sensor shown in FIGS. 4 and 5 is disclosed in PCT/JP95/00165. This sensor includes a coil TC, which is provided in close proximity to a surface of the movable section Rot over a distance L. The coil TC is driven by a signal generator SG1. An AC signal output from the signal generator SG1 is provided to a first winding N1 of the coil TC via a current limiting resistor R1. The coil TC also includes a second winding N2 and outputs an AC signal that is induced by the second winding N2. The coil TC is provided with a resonance capacitor Cr, which resonates at the operating frequency of the AC signal provided by the signal generator SG1.

The rotation detecting means 1 detects changes in impedance at the coil TC that occur in correspondence to indentations or non-through holes Py2 (hereafter referred to as indentations Py2) provided in the surface of the movable section Rot, and outputs a detection signal thereof. A change in impedance at the coil TC depending upon the presence or absence of an indentation Py2 at the movable section Rot is detected by the sensor circuit included in the rotation detecting means 1 and the sensor circuit outputs the AC signal e. When the coil TC is used, the movable section Rot should be constituted of a metal material. Note that the structure of the coil TC does not necessarily have to be limited to that shown in the figures. For instance, the coil TC may be provided with only one winding. Apart from this, various coil structures for electromagnetic induction sensors may be adopted.

The rotation monitoring circuit 2 includes an AC amplifier A1, a rectifier circuit RC1 and an electromagnetic relay RL1. The AC amplifier A1 amplifies the AC signal e output from the rotation detecting means 1. The rectifier circuit RC1 rectifies the amplified AC signal provided by the AC amplifier A1. The rectifier circuit RC1 is capable of satisfactory response even when the signal obtained as the movable section Rot rotates has become a low-frequency signal.

When the movable section Rot is rotating, the AC signal e is output from the rotation detecting means 1. This AC signal e is amplified at the AC amplifier A1 and the AC signal thus amplified is then rectified at the rectifier circuit RC1. The electromagnetic relay RL1 is excited by the rectified output provided by the rectifier circuit RC1 and then its contact point becomes closed. The closed state of the contact point corresponds to a rotation-presence signal Y.

When the movable section Rot stops rotating, the AC signal e is no longer output from the rotation detecting means 1. This sets the electromagnetic relay RL1 in an unexcited state to set its contact point to open. The open state of the contact point corresponds to a rotation stop signal.

The rotation stop monitoring circuit 3, which is provided with the AC signal e by the rotation detecting means 1, outputs a rotation stop signal Z. A signal generator SG2 and a transformer T1 are provided on the line that extends from the rotation detecting means 1 through the rotation stop monitoring circuit 3. The signal generator SG2 provides a current signal w whose frequency is higher than that of the AC signal e output from the rotation detecting means 1 to the rotation stop monitoring circuit 3 via the transformer T1. This signal w has a smaller amplitude than that of the rotation signal e, which is generated as the movable section Rot rotates. A capacitor Co, which is connected to the input of the rotation monitoring circuit 2, is provided in order to prevent this high frequency signal w from being communicated to the rotation monitoring circuit 2. It is desirable to constitute the capacitor Co with a 4-terminal capacitor in order to avoid loss of function caused by a disconnection failure at its lead wire.

The rotation stop monitoring circuit 3 includes the signal generator SG2, an AC amplifier A2, a rectifier circuit RC2, a level detecting circuit LV1, an on-delay circuit OND and an electromagnetic relay RL2.

Figure 6:
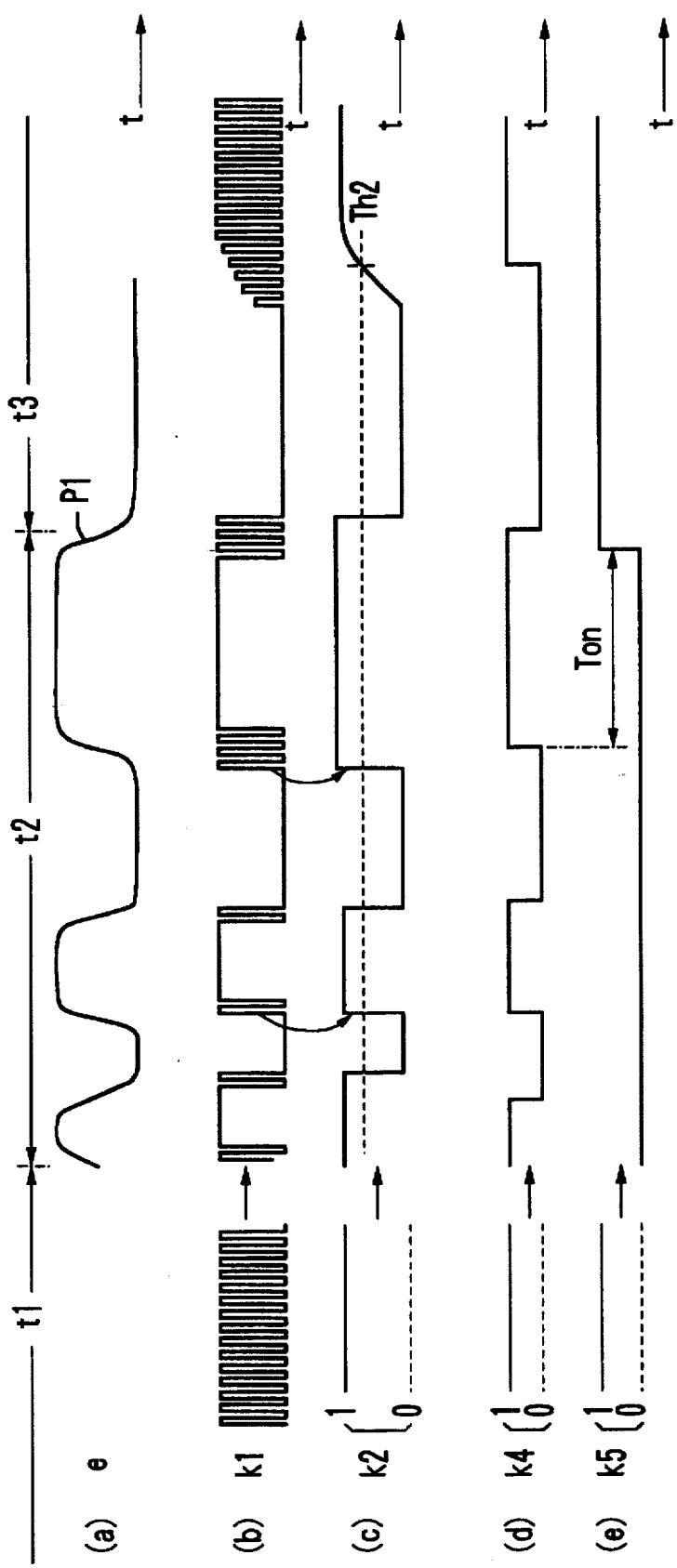
FIG. 6 shows time charts that illustrate the operation of the safety ensuring apparatus shown in FIG. 1.

The AC amplifier A2 amplifies the high frequency signal w provided by the signal generator SG2 via an capacitor C1 and the AC signal e (see FIG. 6(a)) provided by the rotation detecting means 1, and provides the signal K1 (see FIG. 6(b)) thus amplified to a voltage doubler rectifier circuit RC2.

A coupling capacitor C2 of the voltage doubler rectifier circuit RC2 has a large capacitance. As a result, the high frequency signal w provided by the signal generator SG2 and the AC signal e provided by the rotation detecting means 1 are communicated to a rear stage via the coupling capacitor C2. A smoothing capacitor C3 of the voltage doubler rectifier circuit RC2, which is connected at a stage to the rear of the coupling capacitor C2, has a small capacitance. Consequently, while the high frequency signal w is subject to the smoothing effect imparted by the smoothing capacitor C3, the smoothing effect is not applied to the rotation detection signal c, which has a low frequency. Thus, although a rectified output k2 from the voltage doubler rectifier circuit RC2 changes while the movable section is rotating, as shown in FIG. 6(c), when the rotation stops, only the rectified and smoothed signal of the high frequency signal w is output, to constitute a DC output signal.

The level detecting circuit LV1, which is connected at a stage to the rear of the voltage doubler rectifier circuit RC2 tests the level of the rectified signal k2 output from the voltage doubler rectifier circuit RC2. In FIG. 6(c), the threshold level TH2, indicated with the dotted line, represents the verification level of the level detecting circuit LV1. The level detecting circuit LV1 outputs an output signal k4 (see FIG. 6(d)) only when the signal k2 output from the voltage doubler rectifier circuit RC2 is at a level higher than the threshold level TH2. The level detecting circuit LV1 may be constituted with a fail-safe window comparator. A window comparator suited for this purpose is disclosed in U.S. Pat. No. 5,345,138.

The on-delay circuit OND measures the sustain time of the signal k4 output from the level detecting circuit LV1. The sustain time of the signal k4 output from the level detecting circuit is lengthened as the rotation of the movable section Rot slows down. When the movable section Rot is rotating, the on-delay time Ton of the on-delay circuit OND is longer than the sustain time of the signal k4 output from the level detecting circuit LV1. As a result, when the movable section Rot is rotating, a signal k5 is not output from the on-delay circuit OND.

When the speed of the rotation of the movable section Rot is reduced to an extent that it may be considered that the rotation has almost stopped, the sustain time of the signal k4 output from the level detecting circuit LV1 becomes longer than the on-delay time Ton of the on-delay circuit OND. Because of this, the signal k5 is output from the on-delay circuit OND. A diode D3 and a capacitor C4 are connected at a stage to the rear of the on-delay circuit OND. The signal k5 output from the on-delay circuit OND is rectified by the diode D3 and also charges the capacitor C4. The capacitor C4 holds the signal k5, which is intermittently generated as the movable section Rot rotates, at peak. Then, when the movable section Rot stops rotating, or the movable section Rot slows down its rotation to an extent that it may be considered that the rotation has almost stopped, a continuous DC voltage is supplied to the electromagnetic relay RL2 to excite the electromagnetic relay RL2. When the electromagnetic relay RL2 is excited, the contact point becomes closed. The ON signal at the contact point then becomes a rotation stop signal Z.

To summarize the operation described above, when the movable section Rot is rotating, the electromagnetic relay RL1 of the rotation monitoring circuit 2 is excited and a rotation-presence signal Y is output as an ON signal at its contact point. When the movable section Rot stops rotating or when it slows down its rotation rate to the point where it may be considered that the rotation has stopped, the electromagnetic relay RL2 of the rotation stop monitoring circuit 3 is excited, its contact point becomes closed and a rotation stop signal Z is output as an ON signal at the contact point.

The movable section control circuit 4, to which the rotation-presence signal Y, the rotation stop signal Z and an external command signal are input, drives the power source 5 that includes the motor M and the like with its logic. The power source 5 drives the movable section of a machine 6. The movable section of a machine 6 includes the movable section Rot shown in FIGS. 2 and 4.

Figure 7:
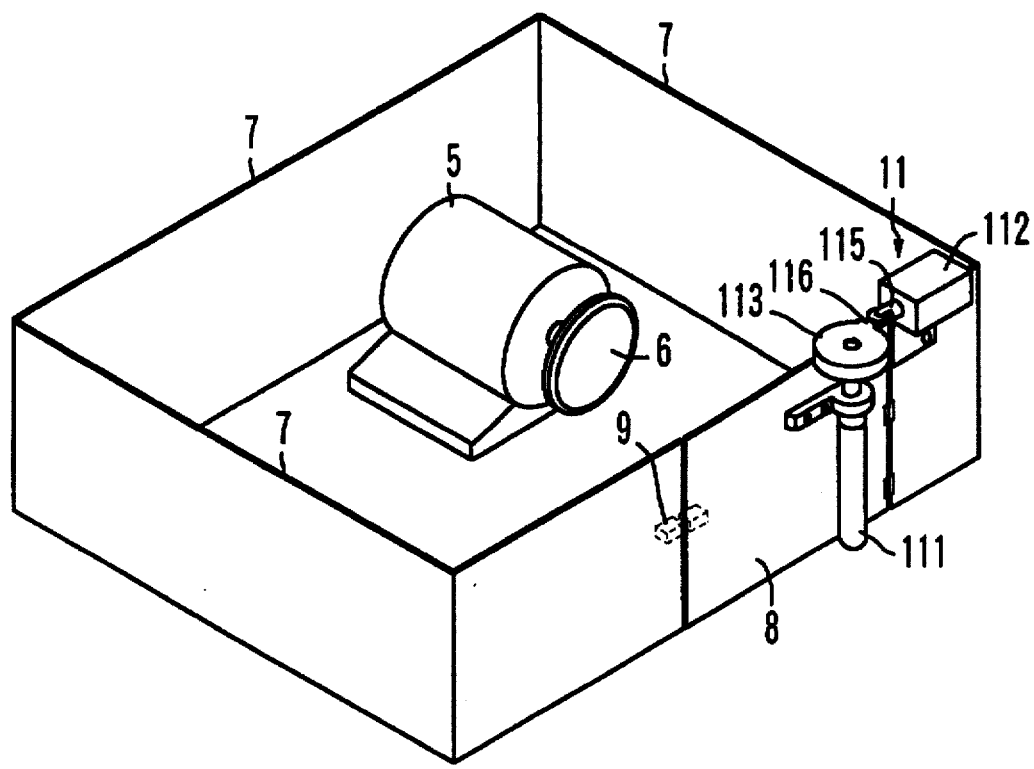
FIG. 7 is a perspective schematically showing the structure of a fence which encloses the movable section of a machine.

Next, in FIG. 7, the movable section of a machine 6 and its power source 5 are provided within the space enclosed by a fence 7 to avoid accidents. A door 8 for allowing the operator access is provided at a portion of the fence 7 and a locking device 9 is installed between the fence 7 and the door 8.

In addition, a door switch 11 is provided at the fence 7 and the door 8 that enclose the movable section of a machine and its power source 5. The door switch 11 includes an actuator 111 and a switch 112. The actuator 111 is provided secured onto the door 8, with a disk-like cam 113 provided at its front end. A projected portion 116 is provided on the circumferential portion of the cam 113. When the door 8 is closed, as shown in FIG. 7, an arm piece 115 of the switch 112 is pressed by the projected portion 116 of the cam 113 provided at the cam 11. It is assumed that the switch 112 is set to OFF in this state. When the door 8 is opened, the actuator 111 rotates as the door 8 rotates, and the arm piece 115 extending from the switch 112 becomes disengaged from the projected piece 116. The switch 112 is turned ON in this state. Such a door switch 11, too, exists in the known art.

Figure 8:
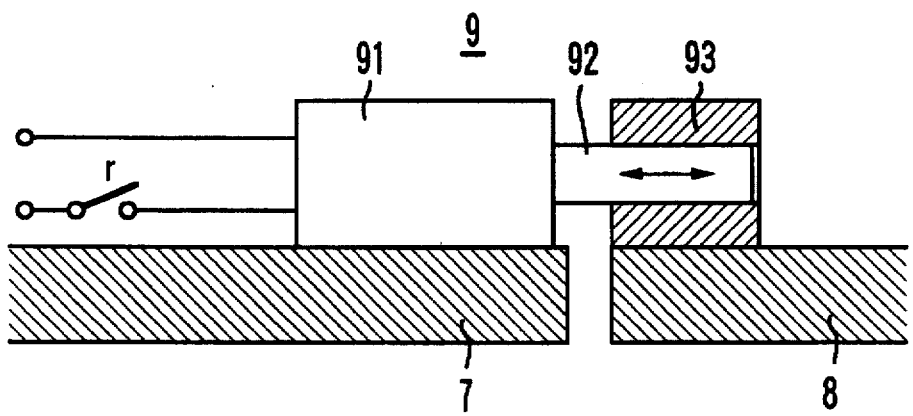
FIG. 8 is a partial cross section showing the structures of the fence and the locking device that is installed at the door, which are shown in FIG. 7.

FIG. 8 shows the locking device 9. The locking device 9 is provided with a solenoid 91 and a plunger 92. When the solenoid 91 is in an unexcited state, the plunger 92 is contained within a receptacle portion 93 and the lock is engaged. When the solenoid 91 is excited, the plunger 92 retracts and becomes disengaged from the receptacle portion 93 to release the lock. When the locking device 9 is released, the door 8 can be opened. The excitation of the solenoid 91 is performed through a contact point r. The state in which the contact point r is closed corresponds to the stoppage of rotation of the movable section Rot. The contact point r may be constituted, for instance, by including the contact point of the electromagnetic relay RL2 shown in FIG. 1.

One of the error modes of the rotation detecting means 1 is a drop at the transmitting element 101 or the receiving element 102. When the transmitting element 101 or the receiving element 102 drops, the signal e output from the rotation detecting means 1 indicates a specific level. Because of this, even if the movable section Rot is rotating, the electromagnetic relay RL2 included in the rotation stop monitoring circuit 3 becomes excited and its contact point closes. As a result, if the contact point of the electromagnetic relay RL2 is used to constitute the contact point r provided at the locking device 9, the door 8 will be set in a state in which it can be opened, and this is a very dangerous situation.

Figure 9:
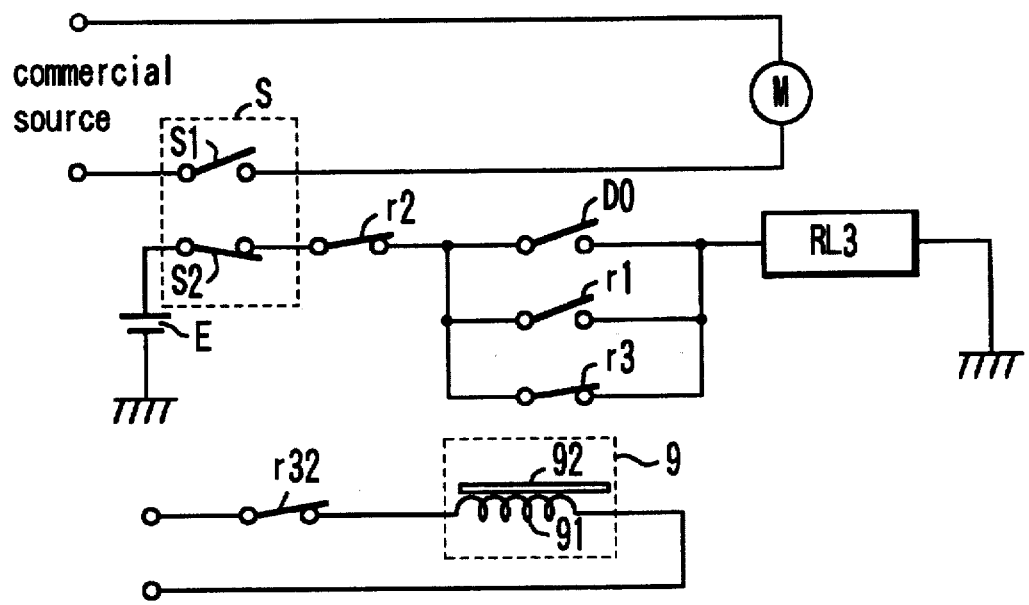
FIG. 9 is an electric circuit diagram of the movable section control circuit in an operation stop state which is employed in the safety ensuring apparatus provided with the fence and the door switch shown in FIG. 7.
Figure 10:
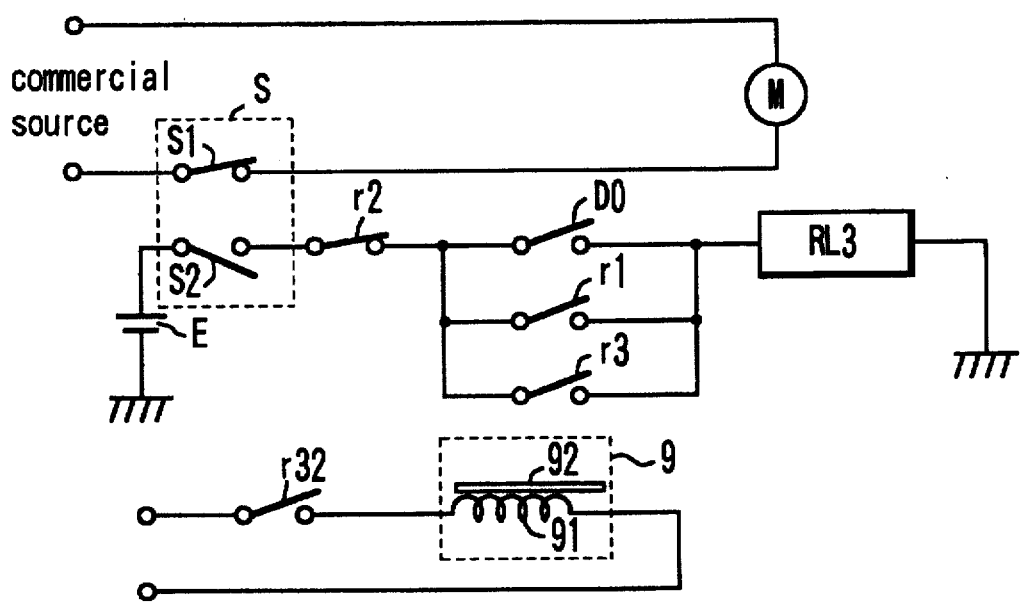
FIG. 10 is an electric circuit diagram of the movable section control circuit immediately after start of operation, which is employed in the safety ensuring apparatus provided with the fence and the door switch shown in FIG. 7.
Figure 11:
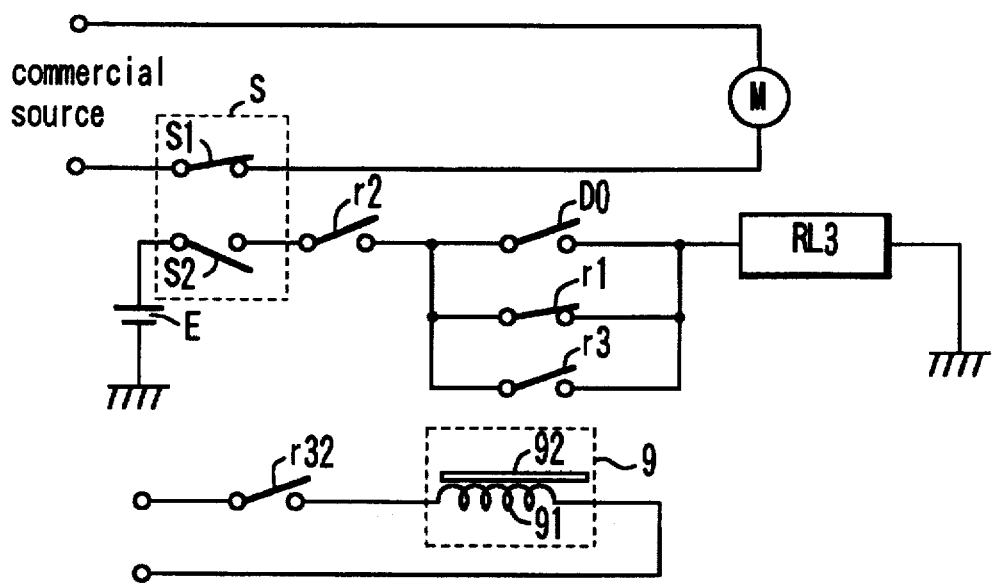
FIG. 11 is an electric circuit diagram of the movable section control circuit in a constant operation state, which is employed in the safety ensuring apparatus provided with the fence and the door switch shown in FIG. 7.
Figure 12:
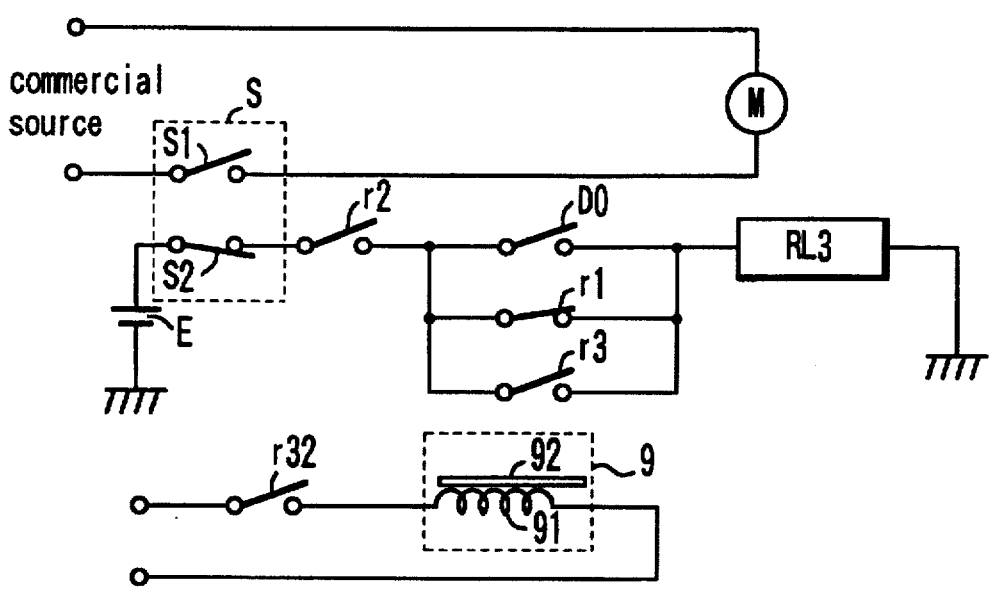
FIG. 12 is an electric circuit diagram of the movable section control circuit immediately after stoppage of operation, which is employed in the safety ensuring apparatus provided with the fence and the door switch shown in FIG. 7.
Figure 13:
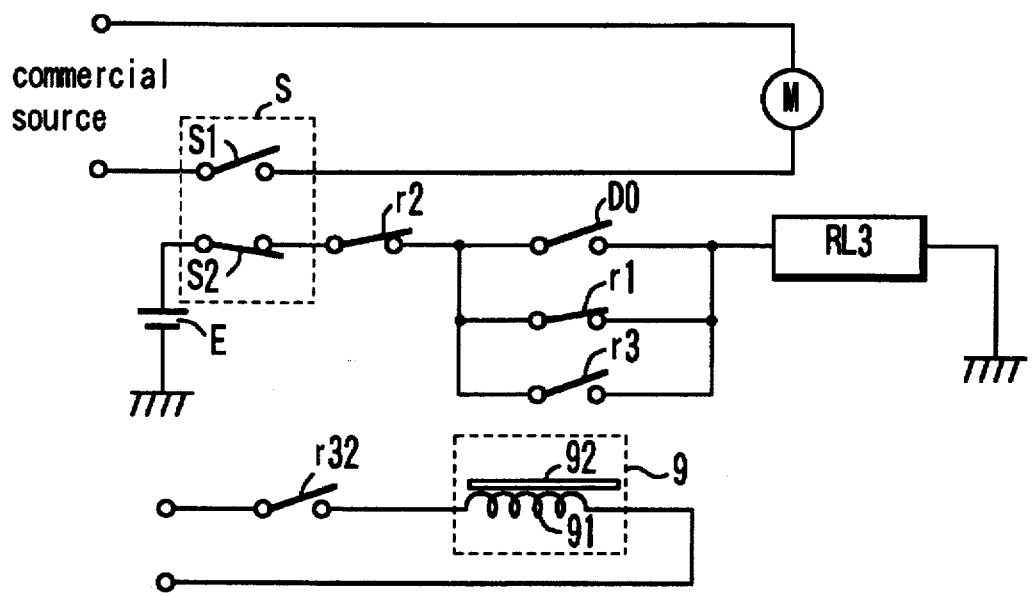
FIG. 13 is an electric circuit diagram of the movable section control circuit while shifting into operation stoppage, which is employed in the safety ensuring apparatus provided with the fence and the door switch shown in FIG. 7.

The present invention discloses a movable section control circuit 4 that is effective for avoiding such a dangerous state. FIGS. 9 to 13 show the structure and the operation of the movable section control circuit 4 disclosed in the present invention. FIG. 9 shows a state in which the operation is stopped, FIG. 10 shows a state immediately after the operation start is performed, FIG. 11 shows a state during constant operation, FIG. 12 shows a state immediately after operation stop is performed and FIG. 13 shows a state of shifting toward the operation stoppage shown in FIG. 9. The components assigned with reference numbers that are mentioned in the following explanation, which are not shown in FIGS. 9 to 13, can be found in FIGS. 1 to 8.

As shown in FIGS. 9 to 13, the movable section control circuit 4 provides an operating switch S, a contact point DO for the door switch 11 and an electromagnetic relay RL3 that constitutes a means for switching. The operating switch S outputs a signal indicating that either the contact point S1 which supplies the movable section ON signal or the contact point S2, which supplies the movable section OFF signal has been selected.

The contact point DO of the door switch 11 is closed when the door 8 is open. The electromagnetic relay RL3 constitutes a self-holding circuit which uses an AND signal constituted of the signal from contact point S1 of the operating switch S and a contact point r2 which provides the rotation stop signal Z as a reset input signal and an OR signal constituted of the ON signal at the contact point DO of the door switch 11 and the rotation-presence signal Y from the contact point r1 as a trigger signal, to provide the locking device 9 with a control signal from a contact point R32.

When the operation of the movable section of a machine 6 is in a stopped state, the contact point S1 of the operating switch S is set to open and the contact point r2, which provides the rotation stopped signal Z, is closed, as shown in FIG. 9. The electromagnetic relay RL3 receives the power source E through the contact point S2, the contact point r2 and its own contact point r3, and self-holding is achieved through its own contact point r3. As a result, the contact point r32 of the electromagnetic relay RL3 is closed and the solenoid 91 constituting the locking device 9 is excited. As explained in reference to FIG. 8, when the solenoid 91 is excited, the plunger 92 retracts to become disengaged from the receptacle portion 93 to release the lock. With the locking device 9 released, the door 8 can be opened.

In order to start operation from the operation stop state shown in FIG. 9, the operating switch S is operated to close the contact point S1. FIG. 10 shows a state immediately after the start of operation. When the contact point S1 of the operating switch S is closed, the motor M rotates. At this point, the contact point S2 is open. Consequently, the electromagnetic relay RL3 enters an unexcited state and the contact point r32 of the electromagnetic relay RL3 is opened. Thus, the solenoid 91 of the locking device 9 enters an unexcited state and the door 8 is locked by the locking device 9. Since the rotation rate of the movable section Rot is low immediately after the start of operation, the contact point r1 is in an open state and the contact point r2 is in a closed state. Since the door switch 11 is off during operation, the contact point DO of the door switch 11 is in an open state.

After a starting operation as described above, the apparatus enters a constant operation state. FIG. 11 shows the constant operation state. In the constant operation state, the contact point S2 is in an open state. Consequently, the electromagnetic relay RL3 enters an unexcited state and the contact point r32 of the electromagnetic relay RL3 is opened. Thus, the solenoid 91 of the locking device 9 enters an unexcited state and the door 8 is locked by the locking device 9. Since the rotation rate of the movable section Rot is sufficiently high, the contact point r1 is in a closed state and the contact point r2 is in an open state. Since the door switch 11 is off during operation, the contact point DO of the door switch 11 is in an open state.

In order to shift from the constant operation state shown in FIG. 11 to operation stop, the operating switch S is operated to open the contact point S1 and close the contact point S2. Since the movable section Rot is rotating under inertia at a rate that is higher than a specific rate immediately after the operation stop is performed, the contact point r1 is in a closed state and the contact point r2 is in an open state, as shown in FIG. 12. The electromagnetic relay RL3 is in an unexcited state with the door 8 remaining locked.

As the operation stop process progresses and the rotating rate of the movable section Rot is lowered to, or below the rate determined at the on-delay circuit OND shown in FIG. 1, the electromagnetic relay RL2 becomes excited and, as shown in FIG. 13, the contact point r2 is closed. Since the movable section Rot is still rotating, albeit at a low rate, the electromagnetic relay RL1 of the rotation monitoring circuit 2 becomes excited and the contact point r1 is in a closed state. As a result, the electromagnetic relay RL3 enters an excited state and the contact point r32 of the electromagnetic relay RL3 enters a closed state.

Subsequently, the state shown in FIG. 9 is achieved, and even when the movable section stops rotation and the contact point r1 enters an open state, the electromagnetic relay RL3 is excited through the contact points r3 and r2, with the contact point r3 holding the closed state. Thus, a self-holding effect is achieved. Then, the solenoid 91 of the locking device 9 is excited via the contact point r32 of the electromagnetic relay RL3 so that the door 8 can be opened.

When the door 8 is to be opened while the electromagnetic relay RL3 is excited, the contact point S1 of the operating switch S is in an open state and the contact points S2 and r2 are in a closed state. By opening the door 8 in this state, the contact point D0 of the door switch 11 is set to a closed state and the electromagnetic relay RL3 enters a state in which it is forcibly triggered by the contact point D0. The contact point D0 shorts the contact point r1. Consequently, if the source E is in an on state, even when the power source E is turned ON/OFF with the door 8 open, the electromagnetic relay RL3 causes the movable section Rot to rotate again so that an excited state can be maintained even without closing the contact point r1.

Next, in reference to FIG. 9, the reason the locking device 9 is not released even if the operating switch S is turned on to drive the movable section of a machine when a sensor such as the transmitting element 101, the receiving element 102 or the like have gone down.

When a sensor such as the transmitting element 101, the receiving element 102 or the like has gone down, the contact point r2 is closed and when, in order to start operation, the contact point S1 of the operating switch S is closed from the operation stop state shown in FIG. 9, the contact point S2 is opened. Because of this, even when the contact point r2 is closed because a sensor has gone down, the source line for the electromagnetic relay RL3 is shut down with the contact point S2 being opened and the electromagnetic relay RL3 becomes unexcited. Consequently, the contact point r32 is opened and the locking device 9 is not released.

An advantageous function of the movable section control circuit 4 described above according to the present invention shown in FIGS. 9 to 13 can be even more clearly demonstrated in comparison to the function achieved in the movable section control circuit disclosed in PCT/JP95/00243.

Figure 14:
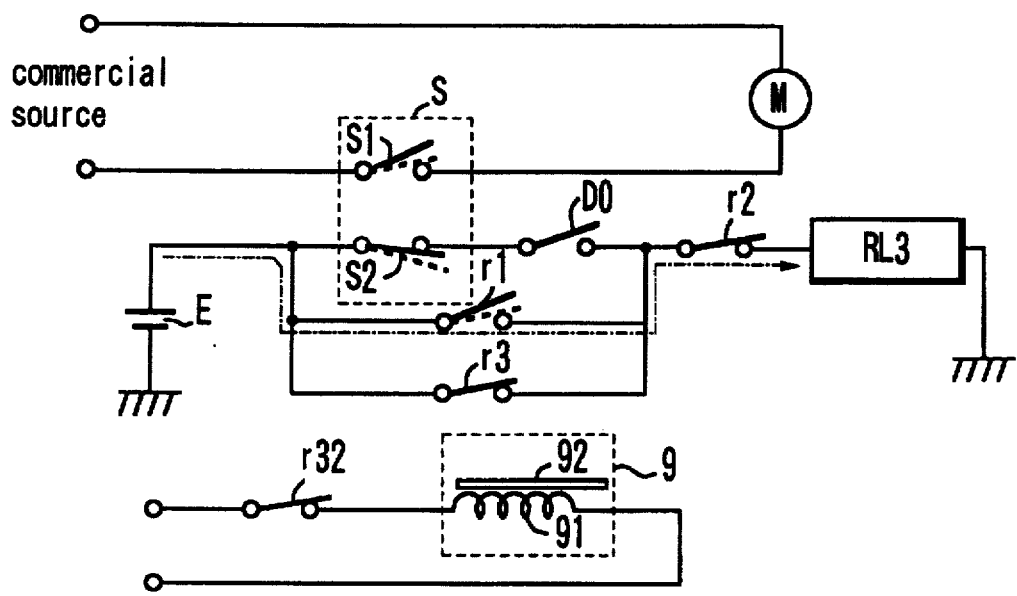
FIG. 14 is a circuit diagram of the movable section control circuit disclosed in PCT/JP95/00243.

FIG. 14 is a diagram of a circuit that is practically identical to that of the movable section control circuit (shown in FIG. 15) disclosed in PCT/JP95/00243. FIG. 14 shows an operation stop state. When the contact point S1 of the operating switch S is closed (indicated with the dotted line) from this operation stop state in order to start operation, the motor M starts rotating. The rotation rate of the movable section Rot driven by the motor M increases and the contact point r1 of the electromagnetic relay RL1 of the rotation monitoring circuit 2 is closed (indicated with the dotted line). If the contact point r2 of the electromagnetic relay RL2 included in the rotation stop monitoring circuit 3 has been closed with the sensor having gone down at this point, the electromagnetic relay RL3 becomes excited through the contact points r1 and r2 and self-holding is achieved with the contact point r3. As a result, the contact point r32 of the electromagnetic relay RL3 maintains a closed state and the solenoid 91 of the locking device 9 is excited. Thus, it becomes possible to open the door 8 and a very dangerous state arises. According to the present invention, such a dangerous state can be avoided.

While a signal from the switch is used as an OFF signal in driving of the movable section in the embodiment described above, detection may be performed by using a current sensor in driving the movable section motor to perform logic calculation based upon the detection signal thereof. A sensor that detects non-application of an electric current is disclosed in U.S. Pat. No. 5,345,138, for instance. It is also obvious that the door switch, too, may output a signal from a sensor instead of a contact point.

The rotation stop monitoring circuit 3 may be achieved by adopting the technology disclosed in International Application PCT/JP95/00165 which was submitted by the applicant. The technology disclosed in International Application PCT/JP95/00165 is especially effective when the rotation sensor includes the coil shown in FIGS. 4 and 5. An example of its application is explained below.

Figure 15:
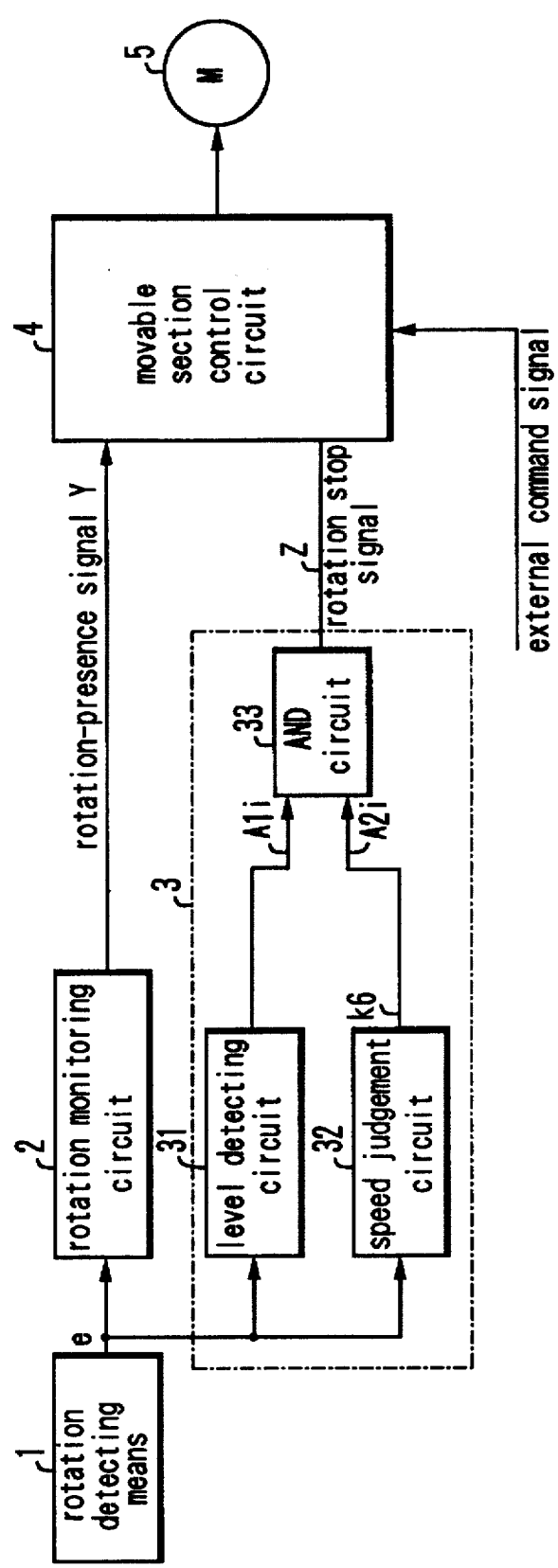
FIG. 15 is a block diagram of another example of the safety ensuring apparatus according to the present invention.

In FIG. 15, the movable section stop verifying device according to the present invention includes a rotation detecting means 1, a speed judgement circuit 32, a level detecting circuit 31 and an AND circuit 33. Since the explanation of the rotation detecting means 1 has already been given, its explanation is omitted here.

The speed judgement circuit 32, to which a detection signal e output from the rotation detecting means 1 is provided, outputs a high level output signal A2i (logical value 1), when the signal e indicates a specific speed or lower.

The level detecting circuit 31, to which the detection signal e is also provided by the rotation detecting means 1, generates an output signal A1i at a high level (logical value 1) when the detection signal e is at or higher than a specific level. The level detecting circuit 31 is provided to monitor the distance L between the sensor constituted of a coil and the movable section Rot.

The AND circuit 33, to which the output signals A1i and A2i are provided by the level detecting circuit 31 and the speed judgement circuit 32 respectively, generates an output signal Z constituted of the AND calculation of the two output signals A1i and A2i. When the sensor is mounted in a normal manner relative to the movable section Rot, if the output signal A1i from the level detecting circuit 31 is at high level (logical value 1), and the output signal A2i from the speed judgement circuit 32 has logical value 1, the output signal Z from the AND circuit 33 is at high level (logical value 1) to indicate that the movable section is stopped. When the logical value of either of the input signals is 0, the output signal Z is set to low (logical value 0).

The speed judgement circuit 32, to which the detection signal e output from the rotation detecting means 1 is provided, generates the output signal A2i at high level (logical value 1) continuously when the change time interval of the detection signal e is at a specific length of time or longer. Since the change time interval of the detection signal e becomes longer as the rotation rate or traveling speed of the movable section Rot becomes lower, the movable section is assumed to have stopped when the change time interval of the detection signal e is at a specific length of time or longer, and the output signal A2i at high level (logical value 1) is generated, which indicates that the movable section has stopped. With this, the delay in issuing notification of stoppage of the movable section Rot is reduced. The output signal A2i at high level (logical value 1) indicating movable section stop is output continuously. Thus, chattering of the movable section stop notification is prevented.

The level detecting circuit 31, to which the detection signal e output from the rotation detecting means 1 is provided, generates the output signal A1i at high level (logical value 1) when the detection signal e is at or higher than a specific level. Thus, when a state arises in which the distance L is reduced and the movable section Rot might come in contact with the coil, an output signal A1i at low level (logical value 0) is output as a danger signal.

The AND circuit 33, to which the output signals A1i and A2i are provided by the level detecting circuit 31 and the speed judgement circuit 32 respectively, generates the output signal Z constituted of an AND calculation of the two output signals A1i and A2i. Consequently, it is possible to issue notification of movable section stoppage upon verifying that no danger state has arisen in which the coil may come in contact with the movable section Rot.

International Publication WO94/2303 discloses features such as: a signal for indicating rotation included in the output signal of the sensor circuit; the level detecting circuit for monitoring to ensure that the output signal is within a specific level range; a rotation stop monitoring circuit that generates a high level output signal (logical value 1) when the rotation signal included in the output signal dissipates (indicating stoppage of rotation) and the AND calculation output signal constituted of the output signal from the level detecting circuit and the output signal from the rotation stop monitoring circuit used as an output signal of rotation stoppage. However, this prior art technology does not include a movable section speed judgement circuit. Thus, in order to achieve movable section speed judgment, a special contrivance is required. A specific example of this is explained below.

Figure 16:
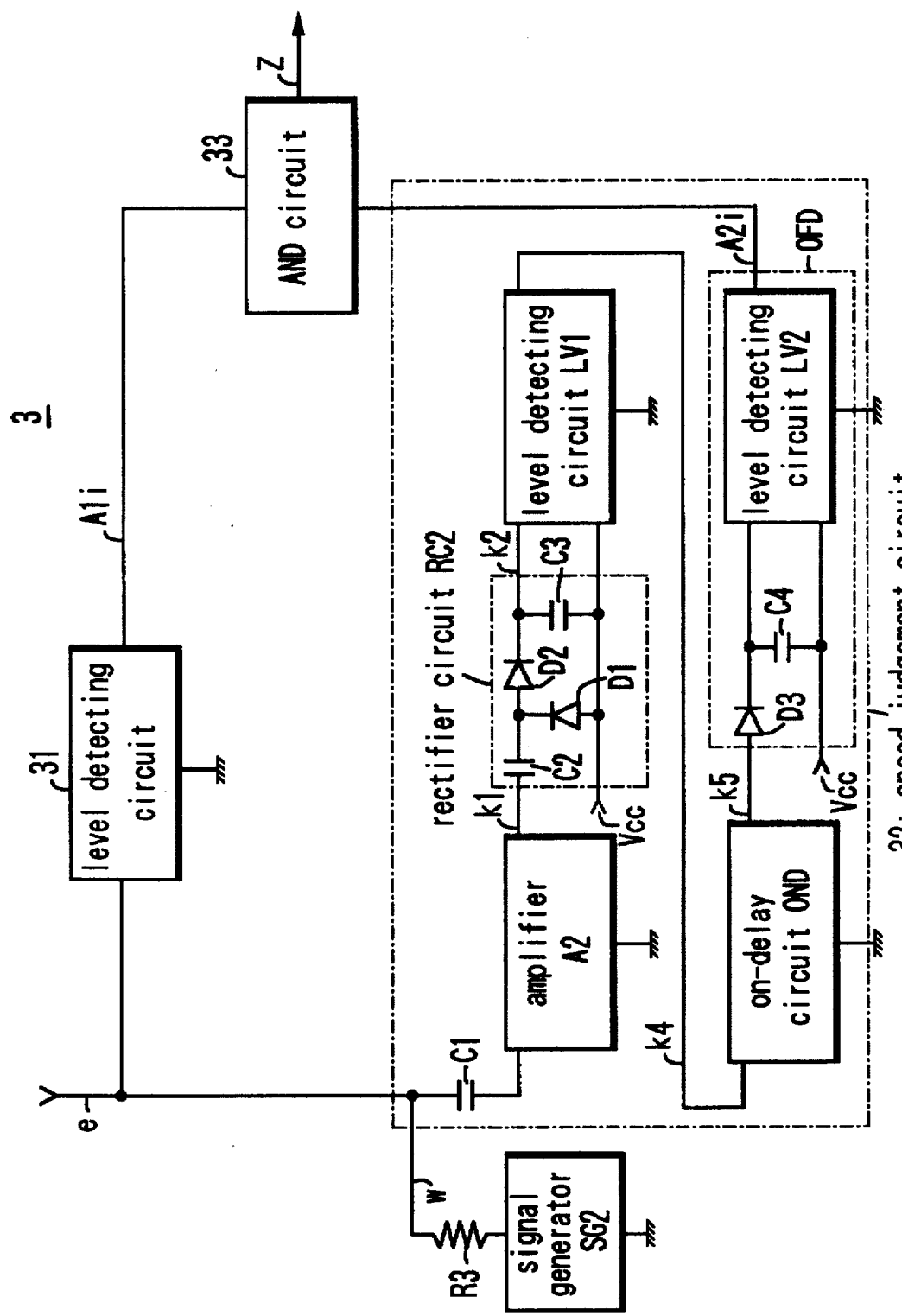
FIG. 16 is an electric circuit diagram of a specific example of the rotation stop monitoring circuit of the safety ensuring apparatus shown in FIG. 15.

The speed judgement circuit 32, which is enclosed with the chain line in FIG. 16, includes an amplifier A2 that amplifies changes in the output signal e that is output from the rotation detecting means 1, a rectifier circuit RC2 for generating the envelope detection output of the output signal from the amplifier A2, a level detecting circuit LV1, an on-delay circuit OND for determining the rotation rate and an off-delay circuit OFD for generating an output signal at a high output level with logical value 1 from the time the movable section Rot enters a low speed rotation state prior to stopping until the movable section Rot enters a high speed rotation state again. The output signal from the off-delay circuit OFD becomes an input signal of the AND circuit 33 as an output signal A2i of the speed judgement circuit 32 along with the output signal A1i from the level detecting circuit 31.

When constituting the level detecting circuit 31, the LV1 and the AND circuit 33 as fail-safe elements, one of the fail-safe window comparators/AND gates disclosed in U.S. Pat. Nos. 5,345,138, 4,661,880 and 5,027,114 may be used. The same applies to the level detecting circuits LV1 and LV2 and the AND circuit 8, which are to be explained later.

The change in the output signal e is input to the amplifier A2 via a coupling capacitor C1. In this case, if a disconnection failure should occur in the capacitor C1, no rotation signal is communicated to the amplifier A2 and, as a result, the speed judgement circuit 32 may indicate a rotation stoppage state even when the movable section is rotating. In order to ensure that such a problem does not occur, a signal generator SG2 is provided in this embodiment. The signal generator SG2 may be trans-coupled with a transformer as shown in FIG. 1. A high frequency output signal w from the signal generator SG2 is superimposed on the signal e via a resistor R3 at low level (logical value 0) and this superimposed signal is input to the amplifier A2. The technology through which a rotation signal is monitored while taking into consideration a possible disconnection failure of the coupling capacitor C1 in this manner is disclosed in the International Publication WO94/23303 mentioned earlier.

In addition, if a DC component is contained in the change in the output signal e occurring as the movable section Rot rotates, a clamping amplifier circuit constituted of a diode may be employed for an AC amplifier circuit which is constituted with the coupling capacitor C1 and the amplifier A2. A state in which a DC component is contained in the change in the output signal from the rectifier circuit RC1, which occurs as the movable section Rot rotates, may arise when the time width over which the output signal is at high level (logical value 1) differs from the time width over which the output signal is at low level (logical value 0). The technology that employs a clamping amplifier circuit for an input signal with the sustained time over which it remains at high level (logical value 1) different from the sustained time over which it remains at low level (logical value 0) is already known through the disclosures made in Japanese Examined Patent Publication Nos. 4320/1980 and 34396/1975.

Figure 17:
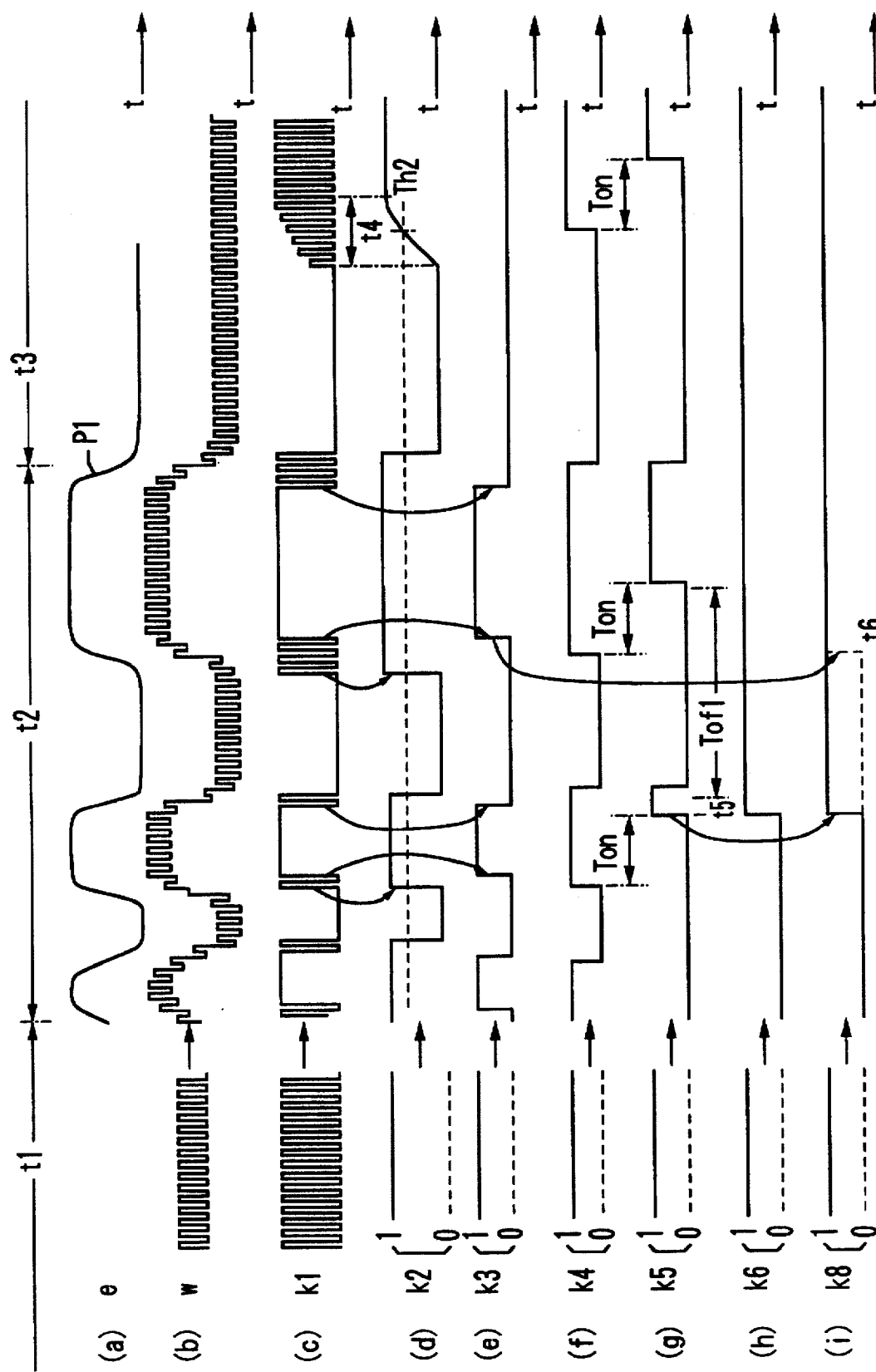
FIG. 17 shows time charts that illustrate the operation of the rotation stop monitoring circuit shown in FIG. 16.

Next, the principle structure and the operation of the speed judgement circuit 32 shown in FIG. 16 are explained in reference to the time chart shown in FIG. 17.

In FIG. 17, time block t1 on the time axis t represents a period during which the movable section Rot is in a stopped state prior to starting to rotate. Time block t2 represents a period during which the movable section Rot is in a transition state in which the movable section Rot shifts from a rotating state to a stopped state and time block t3 is a period during which the movable section Rot is assumed to have reached the stopped state. Time Chart (a) shows the output signal e from the rotation detecting means 1. During the time block t1, over which the movable section Rot is in a stopped state, the output signal e indicates a constant value. During time block t2, the cycle of the change in the amplitude of the output signal e increases as the rotation of the movable section Rot slows down. During time block t3, the movable section Rot has entered a stationary state, and this stoppage is represented as an area between the indentations Py2 in the movable section Rot shown in FIGS. 4 and 5, for instance.

Time Chart (b) shows a state in which the output signal w that is output from the signal generator SG2 is superimposed on the signal e.

Time Chart (c) shows an output signal resulting from the signal w being input to the amplifier A2 via the capacitor C1 and amplified. In the vicinity of the apex of the change in the signal e, since the input level is large, the amplifier A2 becomes saturated and the components of the signal w disappear. The components of the amplified signal w are generated only in the vicinity of the 0 point, which corresponds to the vicinity of the level which represents the average value of the signal e.

At the rectifier circuit RC2 on the output side of the amplifier A2, since the capacitance of the coupling capacitor C2 is sufficiently large, the change in the signal e resulting from rotation is manifested directly as a terminal voltage at the smoothing capacitor C3. The capacitance of the smoothing capacitor C3 is set to ensure that only the high frequency signal w is smoothed. Because of this, as shown in Time Chart (d), only the high frequency signal w of the terminal voltage at the smoothing capacitor C3 is rectified and smoothed, and the portion representing the change in the signal e in the output signal from the amplifier circuit A2 is directly output between the terminals of the capacitor C3.

The output signal from the level detecting circuit LV1, too, follows a pattern similar to that shown in Time Chart (d). In other words, the rectifier circuit RC2 and the level detecting circuit LV1 constitute a low pass filter through which a high level (logical value 1) output signal is generated for a high frequency input signal and an output signal responds to a low frequency input signal.

Since the movable section Rot is stopped during time block t1, only the high frequency signal w is amplified at the amplifier A2, which is then output as an output signal k2 at high level (logical value 1) from the rectifier circuit RC2.

While time block t3 represents a state in which the movable section Rot has stopped after completion of the change P1 in the signal e, the movable section Rot may, in fact, have moved slightly before reaching the next indentation Py2 after passing over an indentation Py2. The amplifier A2 amplifies this change and the component of the signal w is not generated at the coupling capacitor C1 until the electrical charge accumulated because of this .change has been discharged. The rise of the signal during time block t4 in Time Charts (c) and (d) represent this fact. The level Th2 entered in Time Chart (d) indicates the threshold value of the level detecting circuit LV1.

The on-delay circuit OND measures the length of time over which the level detecting circuit LV1 remains in a high level state. In a DC high level state, the state of maximum level output is indicated with logical value 1 whereas the low level state corresponds to logical value 0. The on-delay circuit OND generates a high level (logical value 1) output signal k5 (see Time Chart (g)) when a specific delay time Ton has elapsed after a high level (logical value 1) input signal k4 is input. This signal k5 with logical value 1 signifies that the rotation of the movable section Rot is at or has fallen under a specific speed. Then, if the input signal k4 (see Time Chart (f)) does not remain in the high level state (logical value 1) until the delay time Ton has elapsed and the logical value 0 is set within a short period of time t<Ton, the on-delay circuit OND measures again the period of time over which the high level state is sustained the next time a high level (logical value 1) input signal is generated and generates a high level (logical value 1) output signal k5 after the specific length of time Ton has elapsed. Circuits provided with such a function already exist in the known art, as disclosed in International Publication WO94/23303 mentioned earlier and in Japanese Examined Patent Publication No. 23006/1989.

Since the output signal k5 with logical value 1 that is output from the on-delay circuit OND is generated only when the input signal k4 is at high level (logical value 1), as shown in Time Chart (g), the output signal with logical value 1 is generated only when the signal k4 is at high level (logical value 1) even after the movable section Rot is rotating at a speed at or lower than a specific level and it is, therefore, intermittent. The off-delay circuit OFD is provided with a function for holding the output signal k5 from the on-delay circuit OND, which is generated intermittently as explained above. As shown in FIGS. 4 and 5, in a structure in which the rotation of the movable section Rot is detected intermittently with the timing with which the coil TC comes opposite the indentations Py1 and Py2, it is necessary to hold a signal indicating detection of an indentation Py1 during the period of time after the signal generated by the detection of the indentations Py1 by the coil TC is received until a signal indicating detection of an indentation Py2 is subsequently received. The off-delay circuit OFD is provided to assure such a holding function. In the embodiment shown in FIG. 16, the signal k5, which is output at high level (logical value 1) from the on-delay circuit OND, is integrated by the diode D3 and the capacitor C4 and its level is tested by the level detecting circuit LV2. Discharge of the electrical charge that has accumulated in the capacitor C4 is performed through the input resistance of the level detecting circuit LV2. With this, the intermittent output signal k5 from the on-delay circuit OND is converted to a continuous high level (logical value 1) output signal k6 (see Time Chart (h)).

FIG. 16 shows a circuit configuration in which the output signal from the rectifier circuit is clamped at the source potential Vcc. The reason for this is that the output signal from the amplifier A2 and the signals processed at the level detecting circuits and the on-delay circuit are AC signals and that input signals at a level higher than that of the source potential are required for the level detecting circuits and the on-delay circuit.

Next, in reference to FIGS. 18 to 23, other embodiments of the rotation stop monitoring circuit in the safety ensuring apparatus according to the present invention are explained. In these figures, the same reference numbers as those in FIGS. 15 and 16 are assigned to identical components.

Figure 18:
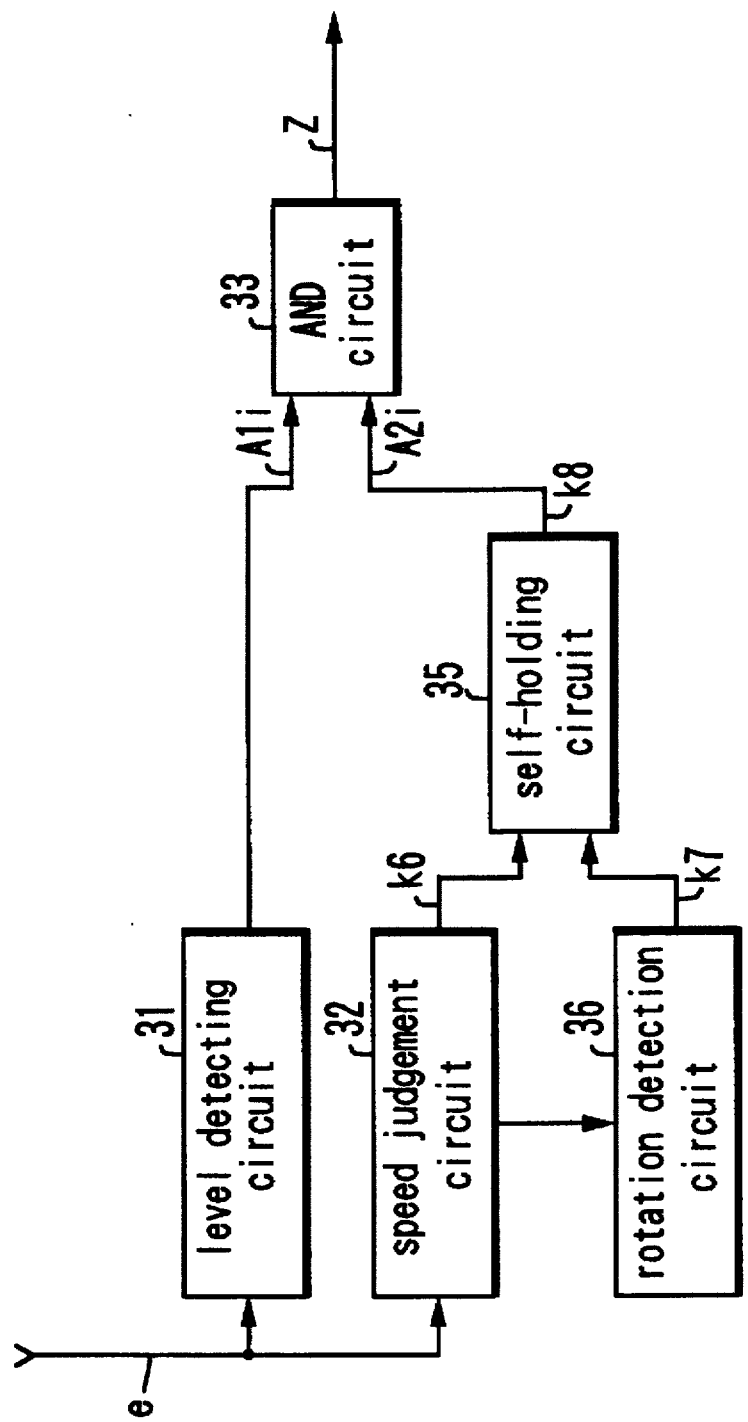
FIG. 18 is a block diagram of another example of the rotation stop monitoring circuit.

First, in FIG. 18, the rotation stop monitoring circuit 3 includes a self-holding circuit 35. The self-holding circuit 35 uses the change in the output signal from the rotation detecting means 1 as a trigger input signal and uses the output signal k6 from the speed judgement circuit 32 as a reset input signal. The AND circuit 33, to which the output signals A2i and A1i are provided by the self-holding circuit 35 and the level detecting circuit 31 respectively, generates an output signal Z constituted of the AND calculation of the two output signals A2i and A1i. When the movable section Rot is rotating or moving, the output signal e from the rotation detecting means 1 changes in conformance to changes at the surface of the movable section Rot, as explained earlier.

Since the self-holding circuit 35 uses the change in the output signal e from the rotation detecting means 1 as a trigger input signal, the rotation or movement of the movable section Rot is monitored at all times. The self-holding circuit 35, upon receiving the trigger input signal described above, is further provided with the reset input signal k6 (see Time Chart (h) in FIG. 17) which is constituted of the output signal from the speed judgement circuit 32, and when the reset input signal is set to high (logical value 1), the self-holding circuit 35 generates a high level (logical value 1) self-holding output k8 (see Time Chart (i) in FIG. 17). As a result, in this embodiment, the notification of movable section stoppage is issued based upon verification that the movable section Rot has been monitored until immediately before the issuing of the notification.

The AND circuit 33, to which the output signals A2i and A1i are provided by the self-holding circuit 35 and the level detecting circuit 31 respectively, generates the output signal Z constituted of the AND calculation of the two output signals A2i and A1i. Consequently, notification that the movable section Rot has stopped may be issued based upon verification that the movable section Rot has been monitored until immediately before the issuing of the notification of movable section stoppage as well as based upon verification that the rotation detecting means 1 is combined with the movable section Rot correctly without an error such as dropping taking place.

In the embodiment shown in the figure, a rotation detection circuit 36 is provided. The rotation detection circuit 36 is a circuit for detecting rotation. With this rotation detection circuit 36, a signal indicating rotation is extracted from the speed judgement circuit 32. The output signal k7 from the rotation detection circuit 36 and the output signal k6 from the speed judgement circuit 32 are used as a reset signal and a trigger input signal respectively for the self-holding circuit 35 while an output signal k8 from the self-holding circuit 35 is used as an input signal for the AND circuit 33.

Figure 19:
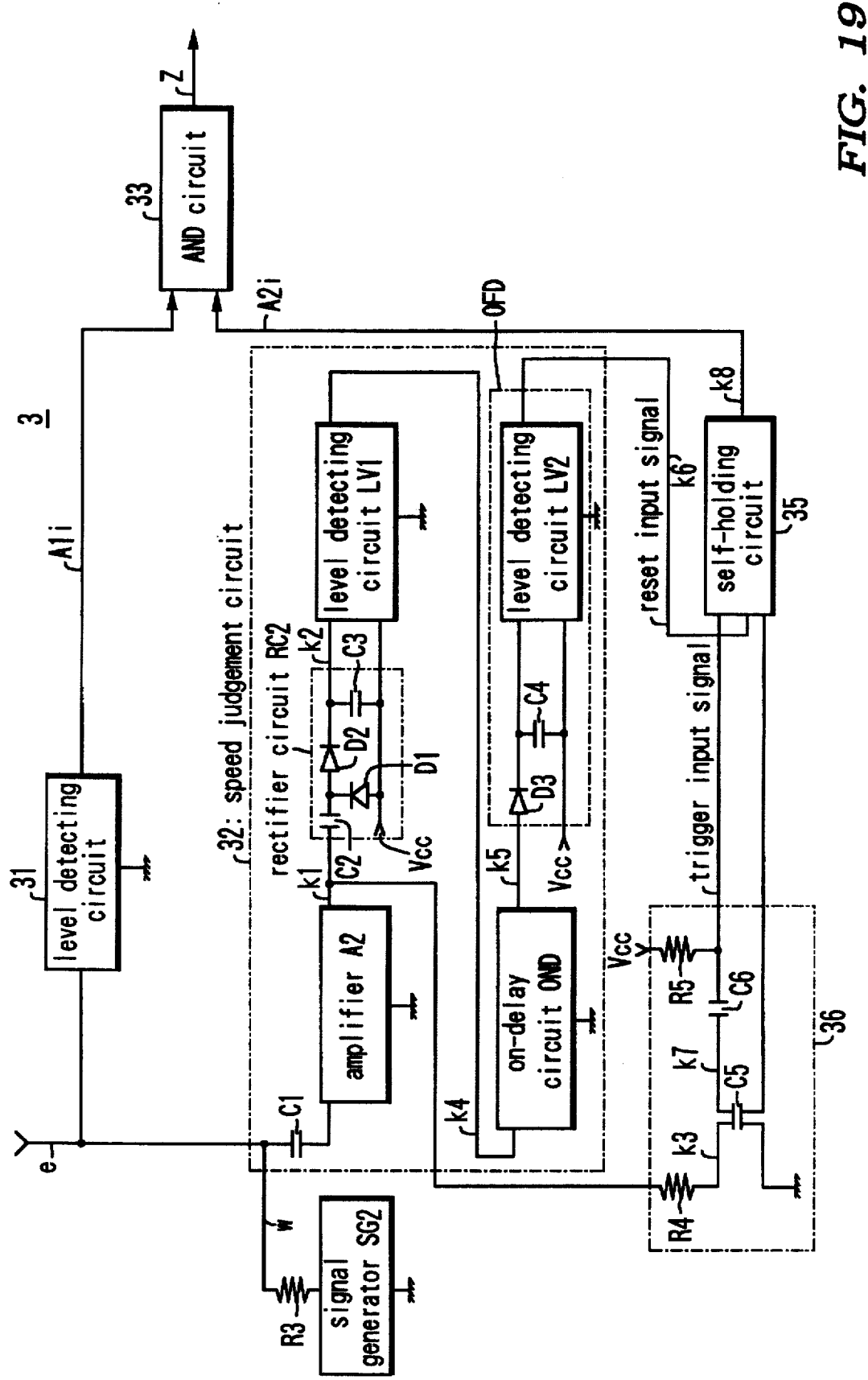
FIG. 19 is a specific circuit diagram of the rotation stop monitoring circuit shown in FIG. 18.

FIG. 19 shows a more specific circuit structure of the rotation stop monitoring circuit shown in FIG. 18. In FIG. 19, the output signal k1 from the amplifier A2, which is a constituent of the speed judgement circuit 32, is input to the rotation detection circuit 36, and the output signal k7 from this rotation detection circuit 36 becomes a trigger input signal for the self-holding circuit 35. The rotation detection circuit 36 includes a current limiting resistor R4, a 4-terminal capacitor C5, a coupling capacitor C6 and a discharge resistor R5. While the capacitor C6 and the resistor R5 constitute a differentiating circuit, if the time constant is large, the change in the voltage between the terminals of the capacitor C5 is directly used as a trigger input signal of the self-holding circuit 35.

The signal k1, which is shown in Time Chart (c) in FIG. 17, is input to the capacitor C5 via the resistor R4. The resistor R4 is inserted so that the capacitor C5 does not affect the output side of the amplifier A2. As in the case of the capacitor C3, the capacitance of the capacitor C5 has a low impedance relative to the high frequency signal w and, consequently, the terminal voltage signal k3 of the capacitor C5 is a signal similar to that shown in Time Chart (d) in FIG. 17. The rise of the signal k3 becomes a trigger signal for the self-holding circuit 35 via the capacitor C6.

The self-holding circuit 35 uses the output signal k6 from the off-delay circuit OFD of the speed judgement circuit 32 as a reset signal. When the output signal k6 of the off-delay circuit OFD rises, the output signal k8 of the self-holding circuit 35 is generated at the time point t5 concurrently with the rise of the output signal k6 if the capacitance of the coupling capacitor C6 is large, or is generated at the point in time (the time point t6) at which the terminal voltage of the capacitor C5 has risen next time if the capacitance of the coupling capacitor C6 is small since the trigger input signal becomes a differential signal in that case, as shown in Time Chart (i) in FIG. 17.

In such a structure, even if the coil TC drops during rotation of the movable section Rot, no output signal will be generated that erroneously indicates stoppage of rotation. In other words, in the rotation stop monitoring circuit shown in FIG. 19, the movable section Rot is monitored until immediately before the signal k8 with logical value 1 is generated to indicate stoppage of rotation. The self-holding circuit may be constituted by employing a circuit in the known art such as any one of those disclosed in International Publication WO94/23303 and International Publication WO94/23496.

Figure 20:
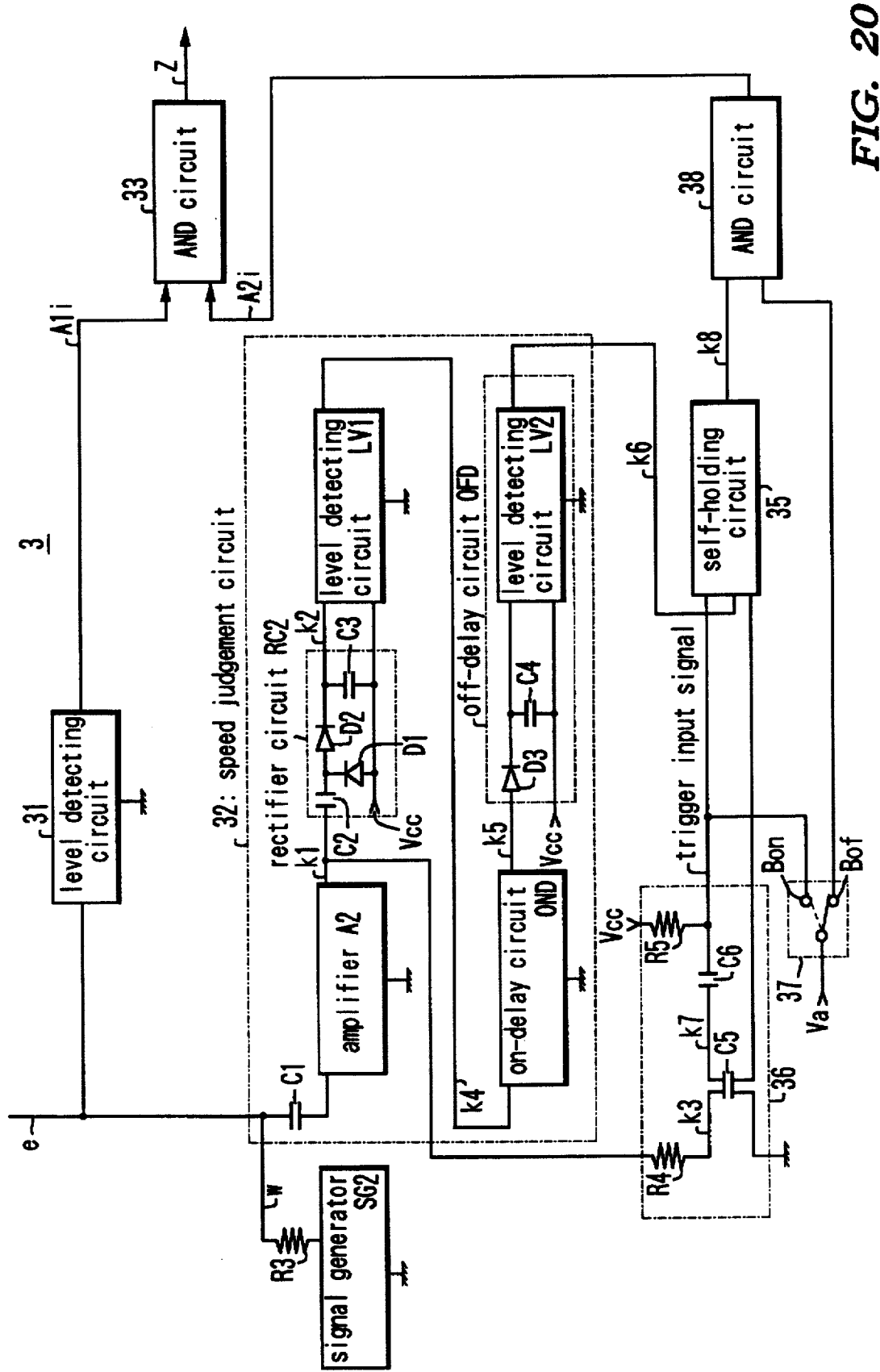
FIG. 20 is a circuit diagram of another example of the rotation stop monitoring circuit.

FIG. 20 shows yet another embodiment of the rotation stop monitoring circuit according to the present invention.

In the embodiment shown in FIGS. 18 and 19, unless the movable section Rot is rotating when the source voltage Vcc is applied, the output signal from the self-holding circuit 35 does not enter a high level state with logical value 1, which indicates stoppage of rotation.

The embodiment shown in FIG. 20 provides a solution to this problem. As a means for achieving the solution, the device in FIG. 20 is provided with a switch 37. If the movable section Rot is stopped at power-up, logical value of the output signal k6 from the off-delay circuit OFD is set to 1. In this state, the switch 37 is connected to the side of the contact point Bon and set to ON in order to forcibly provide a DC input signal Va at high level (logical value 1) for the self-holding circuit 35 as a trigger input signal. With this, the output signal k8 of the self-holding circuit 35 enters a high level state with logical value 1, which indicates stoppage of rotation and, as a result, even at power-up, the output signal k8 from the self-holding circuit 85 can be set in a high level state which corresponds to the stoppage of rotation of the movable section.

If an error occurs such as the input signal Va supplied from the outside remaining in a closed state on the contact point Bon side and being, as a result, constantly input, the self-holding circuit 85 will generate an output whose logical value is 1 at all times. As a means for avoiding such a condition, an AND circuit 28 is provided. By reversing the switch 87 from the contact point Bon to a contact point Bof, a high level input signal Va is provided to the AND circuit 38 through the contact point Bof and the AND circuit 38 uses the AND output signal constituted of this input signal Va and the output signal k8 from the self-holding circuit 35 as an input signal A2i for the AND circuit 33. As a result, since the output signal k8 output from the self-holding circuit 35 is set to high only when a normal trigger input signal resulting from stoppage of rotation of the movable section Rot is provided by the rotation detection circuit 36, the error described above does not occur.

Figure 21:
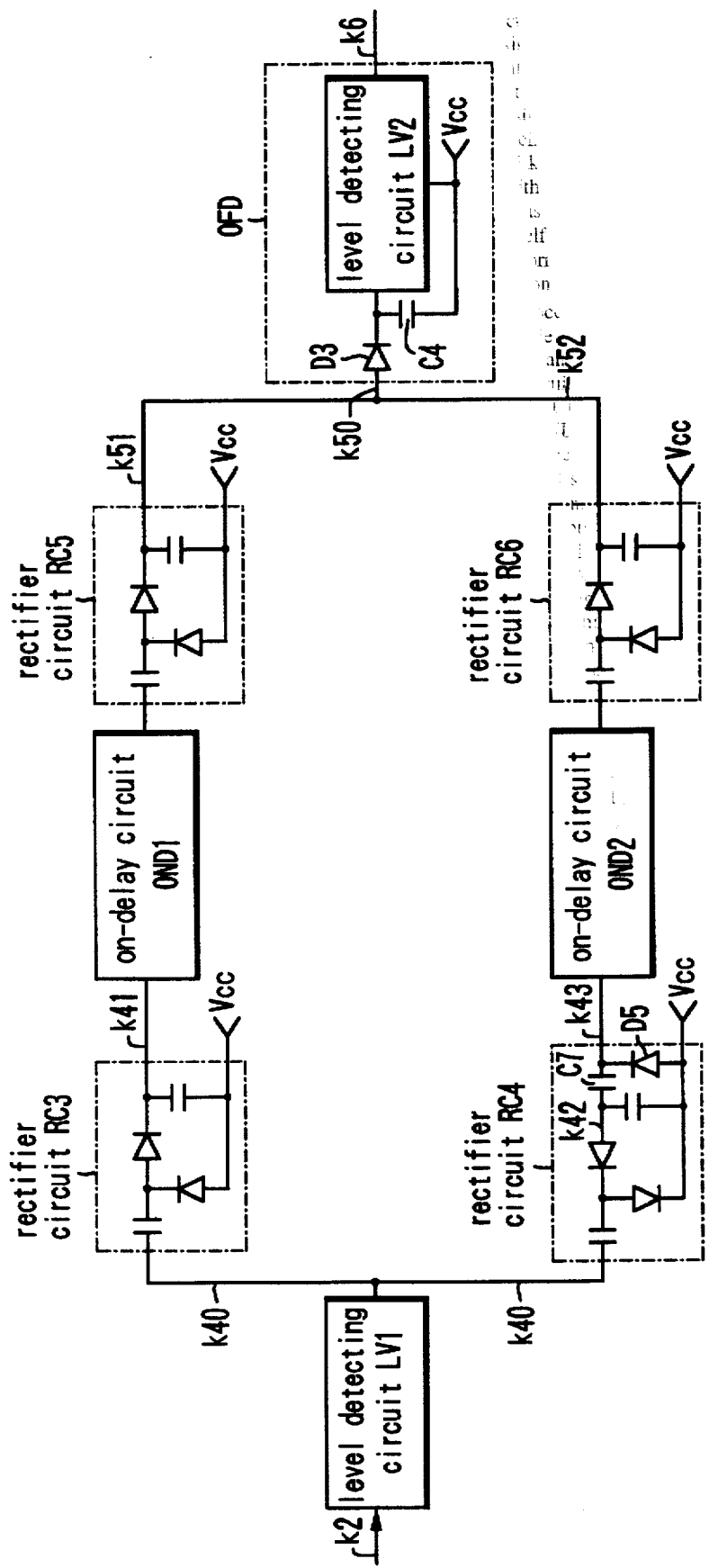
FIG. 21 is an electric circuit diagram of a speed judgement circuit included in the rotation stop monitoring circuit.

Next, in reference to FIG. 21, yet another embodiment is explained.

In the embodiment shown in FIGS. 18 and 19, if the coil TC has already dropped at power-up, an erroneous stoppage verification signal Z will be generated. Taking into consideration the possible dropping of the coil, the device disclosed in International Publication WO94/23303 mentioned earlier is provided with a coil on one side of the bridge circuit to ensure that an output signal for stoppage verification is generated only within a limited range of distance between the metal movable section and the coil. As a means for achieving this, the level detecting circuit is constituted of a window comparator circuit, having upper limit and lower limit threshold values. However, a bridge circuit requires complicated adjustment.

In order to eliminate this problem, in the present invention, the coil TC constitutes a resonance circuit that includes the movable section Rot.

FIG. 21 shows yet another embodiment of the rotation stop monitoring circuit according to the present invention. The circuit in FIG. 21 includes a rectifier circuit RC3, a rectifier circuit RC4, an on-delay circuit OND1, a rectifier circuit RC5, a capacitor C7 for AC coupling, a clamp diode D5, an on-delay circuit OND2, a rectifier circuit RC6 and an off-delay circuit OFD.

The rectifier circuit RC3 rectifies an AC output signal k40 from the level detecting circuit LV1 to a positive voltage signal. The rectifier circuit RC4 rectifies the AC output signal 40 from the level detecting circuit LV1 to a negative voltage signal. The on-delay circuit OND1 operates with a specific delay relative to the rise of an output signal k41 from the rectifier circuit RC3. The rectifier circuit RC5 rectifies an AC output signal from the on-delay circuit OND1 to generate an output signal k51. The capacitor C7 for AC coupling communicates the AC component of an output signal k42 of the rectifier circuit RC4. The AC signal k43 is clamped at a source potential Vcc by the clamp diode D5 to be input to the on-delay circuit OND2. The on-delay circuit OND2 uses the signal k43, Which is transmitted via the capacitor C7, as an input signal. The rectifier circuit RC6 rectifies an AC output signal from the on-delay circuit OND2 to generate an output signal k52. An OR (wired OR) signal constituted of the output signal k51 from the rectifier circuit RC5 and the output signal k52 from the rectifier circuit RC6 is input to the off-delay circuit OFD.

The route through which the AC output signal k40 from the level detecting circuit LV1 is converted to the DC output signal k41 from the rectifier circuit RC3 and then is communicated as the output signal k51 from the rectifier circuit RC5 through the on-delay circuit OND1 and the route through which the AC output signal k40 from the level detecting circuit LV1 is converted to the output signal k42 from the rectifier circuit RC4 and is then communicated as the DC output signal k52 from the rectifier circuit RC6 via the on-delay circuit OND2 are constituted, as far as the circuit structure is concerned, to have a function identical to that of the route through which the signals are communicated from the level detecting circuit LV1 through the on-delay circuit OND in FIGS. 16 and 19 except for the circuit structures of the rectifier circuits RC3 and RC4 and the signal communication path constituted with the capacitor C7 and the diode D5.

Figure 22:
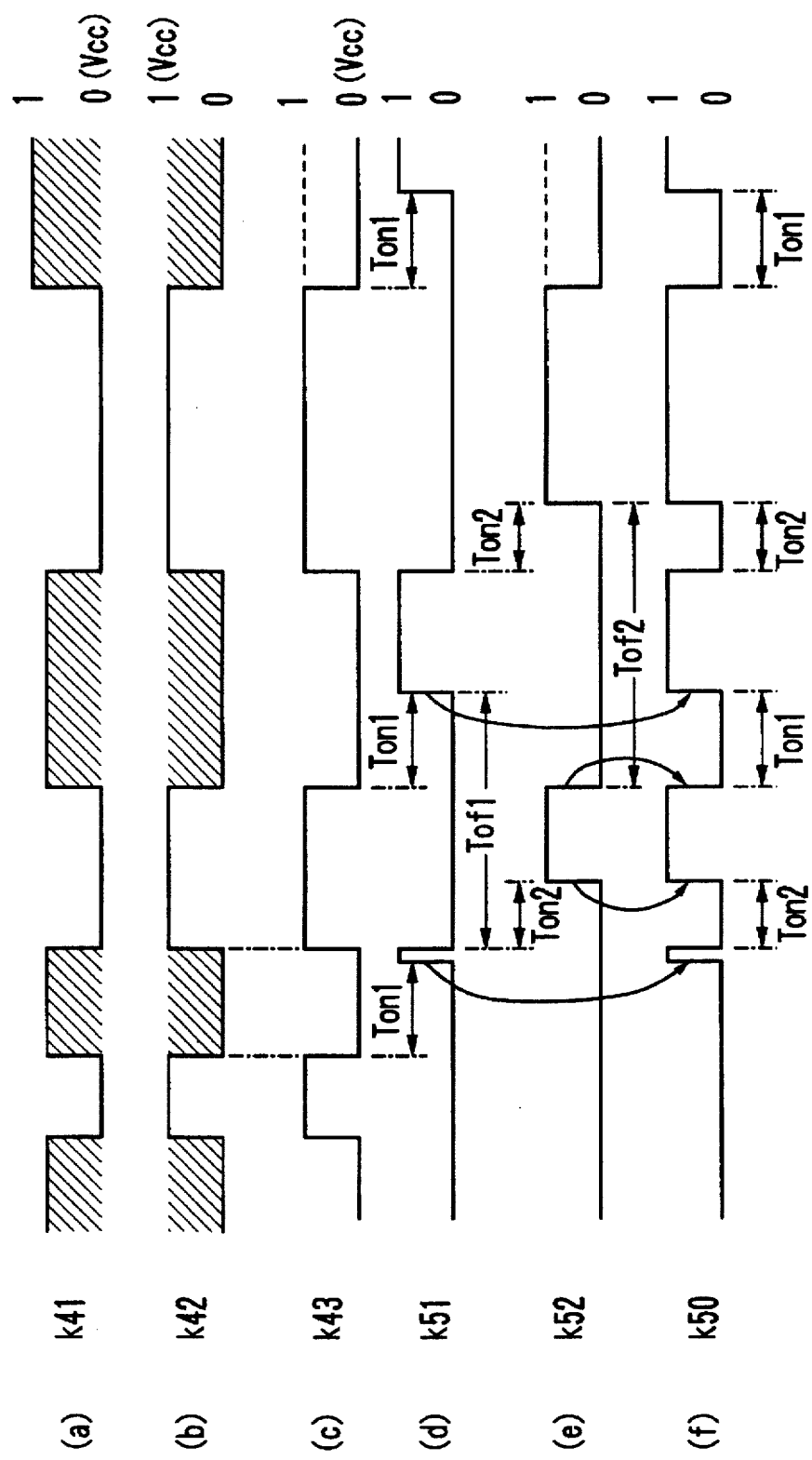
FIG. 22 shows time charts that illustrate the operation performed when the speed judgement circuit shown in FIG. 21 is employed.

Next, in reference to the time charts shown in FIG. 22, the operation of the circuit shown in FIG. 21 is explained. The output signal k40 from the level detecting circuit LV1 is rectified at the rectifier circuit RC3 and is generated as the positive rectified output signal k41. This rectified output signal k41 changes between the source potential Vcc (logical value 0) and a positive output voltage (logical value 1) which is at a higher level than the source potential Vcc, in conformance to the presence/absence of an indentation Py2 in the movable section Rot, as shown in Time Chart (a) in FIG. 22. The shaded areas indicate time intervals during which the rectified DC output signal k40 is generated.

The output signal k51 from the on-delay circuit OND1 is generated with a delay equivalent to the rise delay time Ton1 of the on-delay circuit OND1 after the rectified output signal k41 is generated, as shown in Time Chart (d). Then, as shown in FIG. 17, the duration of output dissipation time constituted of the time Tof1 constitutes wait time.

The output signal k42 from the rectifier circuit RC4 that rectifies the output signal k40 from the level detecting circuit LV1 to a negative signal becomes a signal that changes between the source potential Vcc (logical value 1) and a negative output voltage (logical value 0) that is at a lower level than the source potential Vcc in conformance to the presence/absence of an indentation Py2 in the movable section Rot, as shown in Time Chart (b). The shaded areas indicate the time intervals over which the rectified DC output signal k42 is generated. This output signal k42 is input to the on-delay circuit OND2 as the signal k43 (see Time Chart (c) in FIG. 21) via the capacitor C7 and the clamp diode DS. Since the signal k43 is clamped at the source potential Vcc by the diode D5, the level of the logical value 0 is set to the source potential Vcc, as shown in Time Chart (c). The output signal k52 (see Time Chart (e)) obtained through the on-delay circuit OND2 and the rectifier circuit RC6 is generated with a delay equivalent to the rise delay time Ton2 of the on-delay circuit OND2 after the signal k43 is generated, and then, as shown in Time Chart (e), after the signal k43 has dissipated, a wait state exists until the output dissipation time constituted of the time period Tof2 has elapsed.

The off-delay circuit OFD uses the OR signal k50 constituted of the output signal k51 from the rectifier circuit RC5 and the output signal k52 from the rectifier circuit RC6 as its input signal. In the case of the OR signal k50, an interval during which the logical value is 0 (low level interval) is generated by the rise delays of the two on-delay circuits OND1 and OND2, as shown in Time Chart (f) and, as a result, the length of time over which it is continuously off is reduced compared to the output dissipation time in the on-delay circuit shown in FIG. 17.

This period of time over which the output is continuously off is significant from the viewpoint of safety. Namely, when the movable section Rot starts to rotate at high speed after stopping temporarily, the output signals from the on-delay circuits dissipate immediately because of the resulting rotation signal. However, the output signal from the off-delay circuit does not dissipate immediately and there will be a delay corresponding to the fall delay time of the off-delay circuit. Thus, as far as safety is concerned, it is desirable that the delay time of the off-delay circuit be short. In the embodiment shown in FIG. 21, a function for low speed judgment effected by an anti-phase signal of the output signal from the level detecting circuit LV1 is added to the on-delay circuit OND1, and the function of the off-delay circuit OFD is incorporated in the OR output signal k50 constituted of the output signals k51 and k52 from the on-delay circuits OND1 and OND2. This makes it possible to reduce the delay time in the off-delay circuit OFD.

Figure 23:
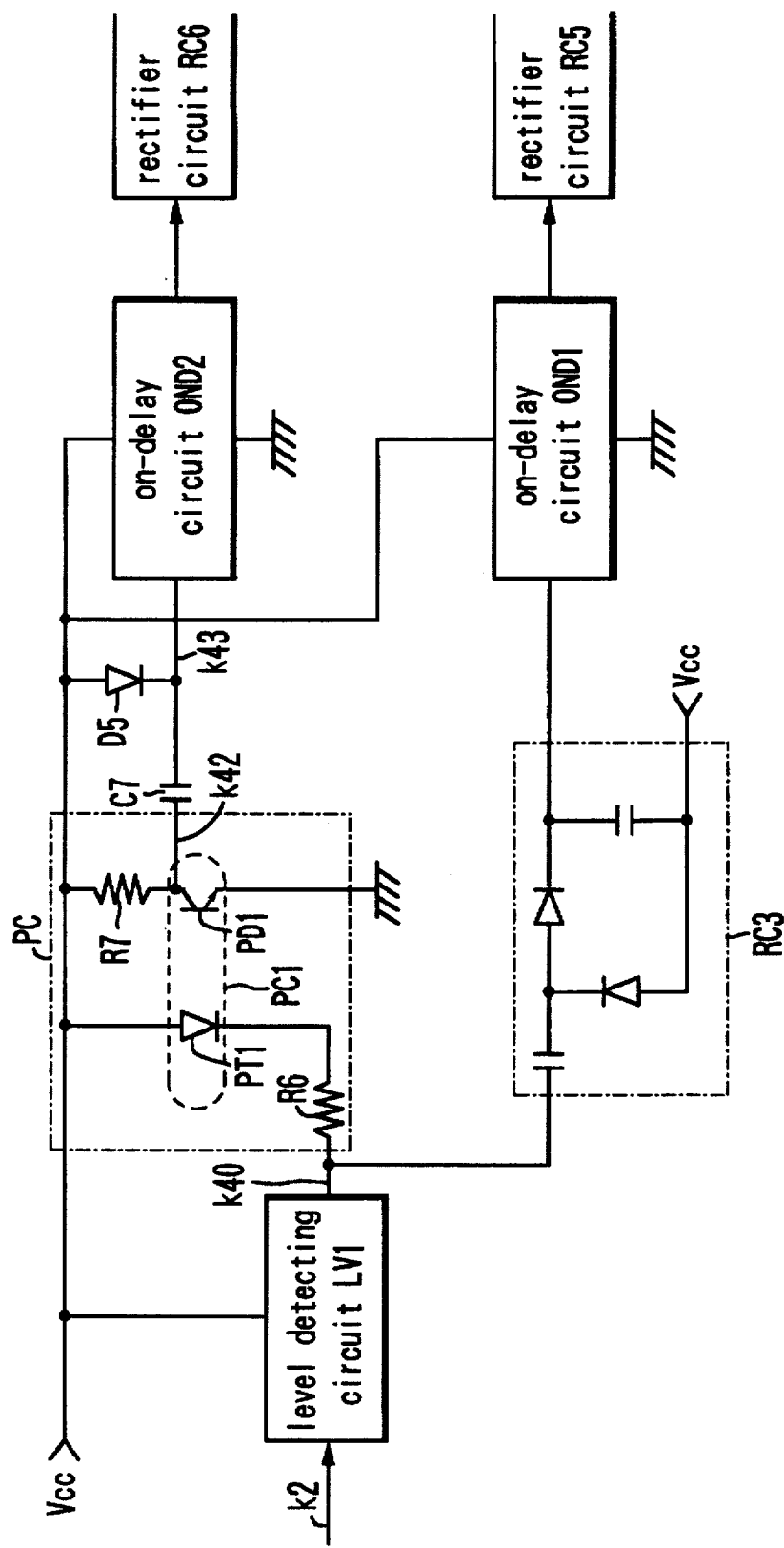
FIG. 23 is an electric circuit diagram of a variation of the speed judgement circuit.

In FIG. 23, an optically coupled circuit PC is employed in place of the negative rectifier circuit RC4 shown in FIG. 21. The optically coupled circuit PC includes an optically coupled element PC1 constituted of a light emitting element PT1 and a light receiving element PD1, a current limiting resistor R6 and a load resistor R7 for the light emitting element PD1. Note that the same reference numbers as those in FIG. 21 are assigned to indicate identical components.

An output current signal k40 from the level detecting circuit LV1 is provided for the light emitting element PT1 via the resistor R6. An optical output signal from the light emitting element PT1 is received at the light receiving element PD1 and when this happens, the terminal voltage of the load resistor R7 changes to generate a signal k42. The signal k42 is output with its phase inverted relative to the optical signal from the light emitting element PT1. In addition, since the high frequency component is not communicated through an optically coupled element, the signal K42 forms a waveform identical to that shown in Time Chart (b) in FIG. 22.

While the present invention has been explained in detail in reference to the preferred embodiments, it will be obvious to persons skilled in the art to which the present invention pertains, that it is not limited to these embodiments and that a number of variations are possible based upon the teachings and spirit of the present invention.

INDUSTRIAL APPLICABILITY

The present invention provides the following possibilities for industrial application.

a) An apparatus can be provided that assures the safety of the operator by using a movable section stop signal and a movable section rotation signal as signals for assuring the safety of the operator against the movable section of a machine when constituting a guard system in which the movable section is enclosed by a fence such that, at a portion thereof, a door having a locking device is provided and the movable section within the fence can be approached when the locking device of the door is released.

b) A safety ensuring apparatus can be provided in which the locking device does not become released even if the operating switch is turned on in order to drive the movable section of a machine when the sensor has gone down.

I claim:

1. A safety ensuring apparatus comprising:

a rotation detecting means detecting rotation of a movable section and outputting a detection signal corresponding to a rotation rate thereof;

a rotation monitoring circuit, to which said detection signal from said rotation detecting means is provided, outputting a rotation-presence signal when said detection signal indicates that said movable section is rotating;

a rotation stop monitoring circuit, to which said detection signal from said rotation detecting means is provided, outputting a rotation stop signal when said detection signal indicates a rotation rate lower than a predetermined rotation rate;

a movable section control circuit using at least either of said rotation-presence signal or said rotation stop signal and an external command signal for input signals, to control said movable section with logic thereof, with;

said movable section being enclosed by a fence and a door at a portion of said fence, and;

said door being provided with a locking device which is controlled by said movable section control circuit, wherein:

said movable section control circuit includes an operating switch, a door switch and a means for switching;

said operating switch outputting either a movable section ON signal or a movable section OFF signal;

said door switch outputting an ON signal which indicates that said door is open, and;

said means for switching constitutes a self-holding circuit which uses an AND signal constituted of said movable section OFF signal from said operating switch and said rotation stop signal as a reset input signal and an OR signal constituted of said ON signal from said door switch and said rotation-presence signal as a trigger signal to provide said locking device with a control signal.

2. A safety ensuring apparatus according to claim 1, wherein:

said rotation stop monitoring circuit includes a speed judgement circuit, a level detecting circuit and an AND circuit;

said speed judgement circuit, to which said detection signal output from said rotation detecting means is provided, continuously generates a high level output signal when intervals between changes in said detection signal become longer than a specific period of time;

said level detecting circuit, to which said detection signal output from said rotation detecting means is provided, generates a high level output signal when said detection signal is at or higher than a specific level, and;

said AND circuit, to which said output signal from said speed judgement circuit and said output signal from said level detecting circuit are provided, generates an output signal constituted of an AND calculation of said output signals.

\* \* \* \* \*